(12) United States Patent
Anders et al.

(10) Patent No.: US 10,679,614 B2
(45) Date of Patent: Jun. 9, 2020

(54) SYSTEMS AND METHOD TO RESOLVE AUDIO-BASED REQUESTS IN A NETWORKED ENVIRONMENT

(71) Applicant: GOOGLE LLC, Mountain View, CA (US)

(72) Inventors: Pedro Gonnet Anders, Zurich (CH); Victor Carbune, Winterthur (CH); Daniel Keysers, Stallikon (CH); Thomas Deselaers, Zurich (CH); Sandro Feuz, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/393,785

(22) Filed: Apr. 24, 2019

(65) Prior Publication Data

US 2019/0348030 A1 Nov. 14, 2019

Related U.S. Application Data

(63) Continuation-in-part of application No. 15/954,174, filed on Apr. 16, 2018, now Pat. No. 10,573,298.

(51) Int. Cl.
*G10L 15/18* (2013.01)
*G10L 15/22* (2006.01)
*G10L 15/19* (2013.01)

(52) U.S. Cl.
CPC ......... *G10L 15/1815* (2013.01); *G10L 15/19* (2013.01); *G10L 15/22* (2013.01); *G10L 2015/223* (2013.01)

(58) Field of Classification Search
CPC ...... G10L 15/1815; G10L 15/22; G10L 15/19
See application file for complete search history.

(56) References Cited

U.S. PATENT DOCUMENTS

| 10,186,256 B2 * | 1/2019 | Li ..................... G10L 15/005 |
| 2007/0192095 A1 * | 8/2007 | Braho ................. G10L 15/01 704/232 |
| 2009/0292530 A1 * | 11/2009 | Jarmulak .............. G06F 40/30 704/10 |

(Continued)

OTHER PUBLICATIONS

"Amazon.com Help: About Amazon Households." https://www.amazon.com/gp/help/customer/display.html?nodeId=201806360&tag=dt-incontent-btn-20&tag=dt-incontent-btn-20. Last accessed Jan. 30, 2018 (2 pages).

(Continued)

*Primary Examiner* — Brian L Albertalli
(74) *Attorney, Agent, or Firm* — Foley & Lardner LLP; James De Vellis

(57) ABSTRACT

Techniques are described herein for enabling an automated assistant to adjust its behavior depending on a detected vocabulary level or other vocal characteristics of an input utterance provided to an automated assistant. The estimated vocabulary level or other vocal characteristics may be used to influence various aspects of a data processing pipeline employed by the automated assistant. In some implementations, one or more tolerance thresholds associated with, for example, grammatical tolerances or vocabulary tolerances, may be adjusted based on the estimated vocabulary level or vocal characteristics of the input utterance.

20 Claims, 8 Drawing Sheets

(56) References Cited

U.S. PATENT DOCUMENTS

| | | | |
|---|---|---|---|
| 2011/0276329 A1* | 11/2011 | Ayabe | G10L 15/22 |
| | | | 704/243 |
| 2014/0337131 A1 | 11/2014 | Edara | |
| 2016/0259308 A1 | 9/2016 | Fadell et al. | |
| 2016/0260135 A1 | 9/2016 | Zomet et al. | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0221471 A1* | 8/2017 | Sharifi | G10L 13/043 |
| 2017/0358301 A1 | 12/2017 | Raitio et al. | |
| 2018/0211559 A1* | 7/2018 | Hamilton, II | G06N 20/00 |
| 2018/0277119 A1* | 9/2018 | Baba | G10L 15/22 |
| 2019/0235831 A1* | 8/2019 | Bao | G10L 15/19 |
| 2020/0004768 A1* | 1/2020 | Bujnowski | G06F 40/284 |

OTHER PUBLICATIONS

"Walmart and Google to offer voice-enabled shopping", BBC News, Aug. 23, 2017 (10 pages).
Abrams, Help users find, interact & re-engage with your app on the Google Assistant, Google Developers Blog, Nov. 15, 2017 (16 pages).
Albrecht, "Alexa, How Can You Be Used in Restaurants?", the spoon, Dec. 10, 2017 (6 pages).
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017 (11 pages).
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018 (6 pages).
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017 (4 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017 (3 pages).
Foghorn Labs, 10 Tips to Improve the Performance of Google Product Listing Ads, printed from Internet address: http://www.foghornlabs.com/2012/11/21/product-listing-ads-best-practices/, on Mar. 18, 2013 (5 pages).
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).

Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013 (6 pages).
Google Inc., Supported File Formats, printed from Internet address: http://www.support.google.com/merchants/bin/answer.py?hl=en&answer=160567, on Mar. 18, 2013 (1 page).
Gurman, et al., "Apple is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017 (6 pages).
Johnston, "Amazon Whirlwind: New Echo, Plus, Spot, Connect, Fire TV Take The Stage", Twice, Sep. 27, 2017 (4 pages).
Kelion, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads on Amazon Echo: Wendy's, ESPN, And Progressive Among Brands Testing", Forbes, May 11, 2017 (2 pages).
Krishna, "Jim Beam's smart decanter will pour you a shot when you ask", engadget, Nov. 29, 2017 (3 pages).
Lacy, "Improving search and advertising are the next frontiers for voice-activated devices", TechCrunch, Dec. 20, 2017 (13 pages).
Larson, Selena, "Google Home now recognizes your individual voice", CNN Money, San Francisco, California, Apr. 20, 2017 (3 pages).
Lee, "Take Two for Samsung's troubled Bixby assistant", BBC News, Oct. 19, 2017 (6 pages).
Lee, Dave, "The five big announcements from Google I/O", BBC News, May 18, 2017 (9 pages).
Lomas, N., "Oyoty is a chatbot designed to teach kids to be safe online." https://techcrunch.com/2016/10/19/oyoty-is-a-chatbot-designed-to-teach-kids-to-be-safe-online/ Posted Oct. 19, 2016. Last accessed on Jan. 30, 2018 (15 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013 (17 pages).
Moore, C., "Keep your kids from spending hundreds of dollars and more ways of parenting with Alexa." https://www.digitaltrends.com/home/amazon-alexa-kid-friendly/ Posted Feb. 12, 2017. Last accessed on Jan. 30, 2018 (5 pages).
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017 (4 pages).
Palladino, "Garmin teamed up with Amazon to make a tiny Echo Dot for your car", ars Technica, Oct. 17, 2017 (2 pages).
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-goog le-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017 (10 pages).
Perez, S., "Amazon adds parental consent to Alexa skills aimed at children, launches first legal kids' skills." https://techcrunch.com/2017/02/31/amazon-adds-parental-consent-to-alexa-skills-aimed-at-children-launches-first-legal-kids-skills/. Posted Aug. 31, 2017. Last accessed on Jan. 30, 2018.
Perez, Sarah, "The first ad network for Alexa Skills shuts down following Amazon's policy changes", Tech Crunch, Jun. 15, 2017 (6 pages).

(56) References Cited

OTHER PUBLICATIONS

Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017 (3 pages).
Purcher, Jack, Today Google Home's Virtual Assistant can learn its Owner's voice for Security Reasons like Apple's Patent Pending Idea, Apr. 20, 2017 (4 pages).
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017 (8 pages).
Willens, Max, "For publishers, Amazon Alexa holds promise but not much money (yet)", Digiday, Jul. 6, 2017 (6 pages).

\* cited by examiner

SYSTEMS AND METHOD TO RESOLVE AUDIO-BASED REQUESTS IN A NETWORKED ENVIRONMENT

CROSS-REFERENCE TO RELATED APPLICATIONS

The present application claims the benefit of priority under 35 U.S.C. § 120 as a continuation-in-part of U.S. patent application Ser. No. 15/954,174 filed Apr. 16, 2018, which is incorporated by reference herein in its entirety.

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, users may provide commands, queries, and/or requests (collectively referred to herein as "queries") using free form natural language input which may include vocal utterances converted into text and then processed and/or typed free form natural language input.

SUMMARY

Techniques are described herein for enabling an automated assistant to adjust its behavior depending on the user who is engaging with the automated assistant. Consequently, the automated assistant is able to use different modes, user accounts, or features based on the user engaged with the automated assistant. The automated assistant can transition between a series of modes, each of the modes can be associated with a user or user group. Various aspects of the automated assistant's behavior may be affected by the mode selected, such as (i) recognition of the user's intent, (ii) resolving the user's intent, and (iii) how the results of resolving the user's intent are output.

According to at least one aspect of the disclosure, a method performed by one or more processors is provided that includes: receiving, at one or more input components of one or more client devices, a vocal utterance from a user; applying data indicative of the vocal utterance across a trained machine learning model to generate output; determine, based on the output, a profile for the user; selecting, from a plurality of candidate query understanding models, a given query understanding model based on the profile; determining an intent of the user using the given query understanding model; determining, based on the profile, that the intent of the user is resolvable; resolving the user's intent to generate responsive data; and outputting, at one or more output components of one or more of the client devices, the responsive data.

In various implementations, the plurality of candidate query understanding models may include at least one candidate query understanding model with a grammatical tolerance that is different than a grammatical tolerance of the given query understanding model. In various implementations, the data indicative of the vocal utterance may include an audio recording of an utterance by the user, and the machine learning model is trained to generate output tailored to the vocabulary of the user based on one or more phonemes contained in the audio recording.

In various implementations, the method may further include selecting, from a plurality of candidate natural language generation models, a given natural language generation model that is associated with the profile, wherein the selected given natural language output model is used to generate the responsive data. In various implementations, the plurality of candidate natural language generation models may include at least one candidate natural language generation model that uses a more complex vocabulary than a vocabulary used by the given natural language output model.

In various implementations, the method may further include selecting, from a plurality of candidate voice synthesis models, a given voice synthesis model based on the profile, wherein outputting the responsive data is performed using the given voice synthesis model. In various implementations, the given query understanding model may be applied to perform speech-to-text processing of the vocal utterance. In various implementations, the given query understanding model may be applied to perform natural language understanding of speech recognition output generated from the vocal utterance.

In another aspect, a method performed by one or more processors is provided that includes: receiving, at one or more input components of one or more client devices, a vocal utterance from a user; applying data indicative of the vocal utterance across a trained machine learning model to generate output; determine, based on the output, that the user falls into a given vocabulary level of a plurality of predetermined vocabulary levels; selecting, from a plurality of candidate query understanding models, a given query understanding model that is associated with the given vocabulary level; determining an intent of the user using the given query understanding model; determining, based on the predetermined vocabulary level, that the intent of the user is resolvable; resolving the user's intent to generate responsive data; and outputting, at one or more output components of one or more of the client devices, the responsive data.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

According to at least one aspect of the disclosure, a system to resolve requests in an audio-based networked system can include a computing device that can include one or more processors and a memory. The one or more processors can execute a proficiency detector to receive a vocal utterance captured at a client device. The proficiency detector can determine a vocal characteristic based on the vocal utterance captured at the client device. The one or more processors can execute a speech-to-text module to select a query understanding model from a plurality of candidate query understanding models based on the vocal characteristic. The one or more processors can execute an intent matcher to determine an intent of the vocal utterance using the query understanding model. The one or more processors can execute a fulfillment module to select a content item based on the intent and one or more keywords parsed from the vocal utterance. The system can include an interface to transmit the content item to the client device.

According to at least one aspect of the disclosure, a method can include receiving, by a proficiency detector executed by one or more processors, a vocal utterance captured at a client device. The method can include determining, by the proficiency detector executed by the one or more processors, a vocal characteristic based on the vocal utterance captured at the client device. The method can include selecting, by a speech-to-text module executed by the one or more processors, a query understanding model from a plurality of candidate query understanding models based on the vocal characteristic. The method can include determining, by an intent matcher executed by the one or more processors, an intent of the vocal utterance using the query understanding model. The method can include selecting, by a fulfillment module executed by the one or more processors, a content item based on the intent and one or more keywords parsed from the vocal utterance. The method can include transmitting, by the one or more processors, the content item to the client device.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
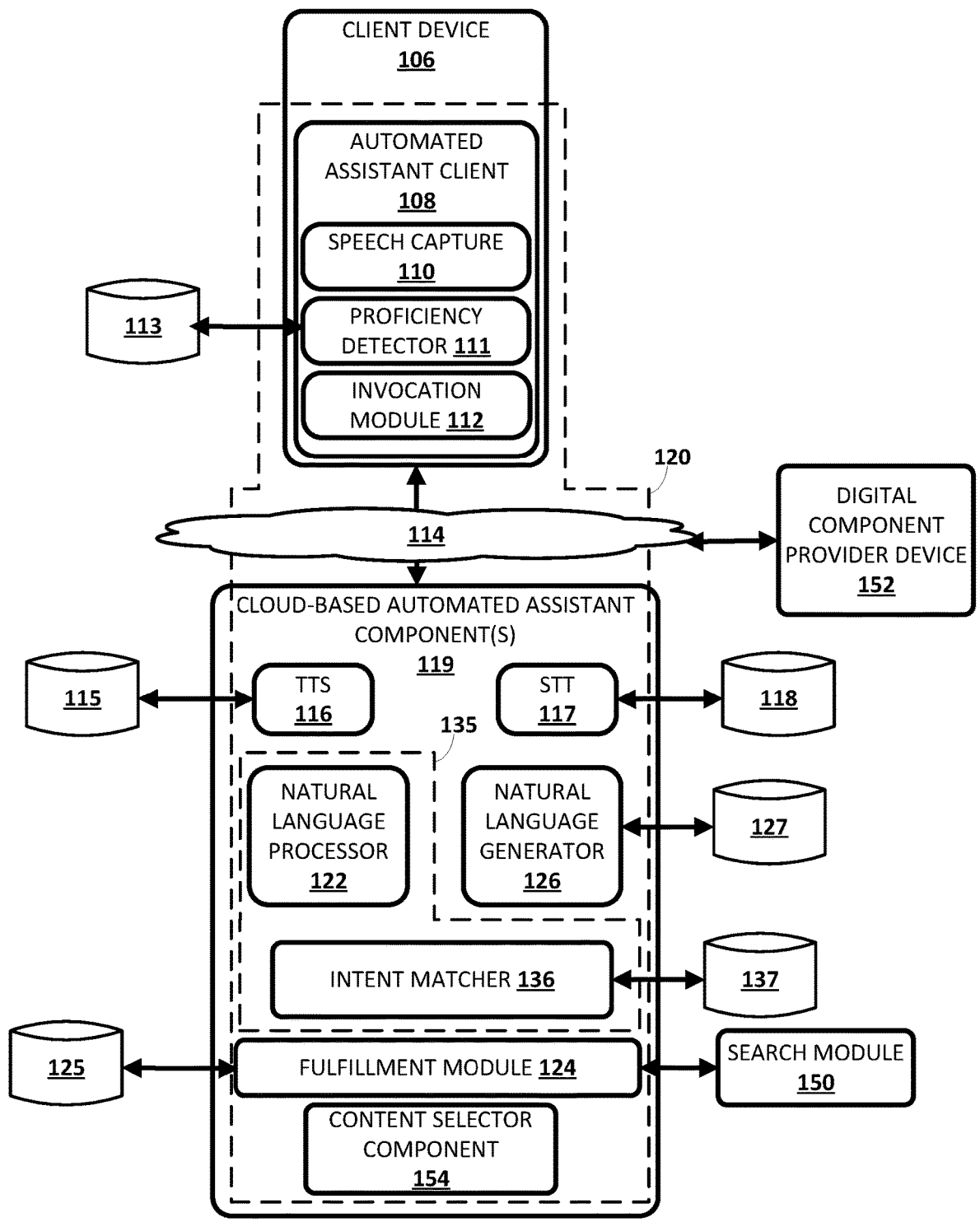
FIG. 1 is a block diagram of an example environment in which implementations disclosed herein may be implemented.

The automated assistant can generate responses to various inputs that, absent techniques described herein, may not be resolvable. The automated assistant described herein can resolve intents to mitigate the use of clarification requests for various inputs, thereby conserving various computer and/or network resources that would otherwise be utilized to generate and render such requests for clarification and/or process further input responsive to the requests for clarification. Further, automated assistants described herein can facilitate more effective interaction with users in situations in which the users may ordinarily have difficulty interacting with assistant devices. This may occur, for instance, when a user's speech is less clear than that of the average user of such devices.

The automated assistant can use a variety of profile or device characteristics, such as location, voice frequencies detected in input voice-based signals, and fundamental frequencies detected in input voice-based signals. The automated assistant can select content or responses based on the profile or device characteristics. The characteristics can include a vocabulary level.

The automated assistant can select a user profile based on characteristics of the input audio signal (e.g., a vocal utterance) that can include a cadence, pitch, phonemes, vocabulary, grammar, or pronunciations, included in the input audio signal. The automated assistant can include a machine learning model that can predict or determine, based on an input audio signal or characteristics thereof, a user profile. For example, a feed forward neural network may be trained, e.g., using training examples in the form of audio samples, to a user profile.

The system can use voice recognition to distinguish between users and select user profiles. Based on the selected user profile, the automated assistant can use, select, or change the utterances that can qualify as invocation phrases for activating the automated assistant. In some implementations, one or more on-device models (e.g., trained artificial intelligence models) may be used, e.g., locally on the client device, to detect predetermined invocation phrases. If a single invocation model is used for all users, the automated assistant can select different thresholds to classify a user's utterance as a proper invocation based on a selected user profile.

The automated assistant can use a selected user profile to determine an intent of a query in an input audio signal. For example, the automated assistant can select one or more candidate "query understanding models" based on the selected user profile to determine an intent of the query. The query understanding models can have a particular "grammatical tolerance" value that controls the automated assistant's tolerance or leeway in interpreting the grammar or vocabulary of the utterance included in an input audio signal. The automated assistant can use the query understanding model during speech-to-text ("STT") processing. For example, when the query understanding model includes a high tolerance, the system may be more tolerant of mispronunciation and/or subpar grammar/vocabulary. When the tolerance level is relatively high the automated assistant can associate speech recognition outputs (e.g., the text of words or phrases) to known words in a dictionary when a match score is relatively low. When the tolerance high, the automated assistant may not match the term with a term in a dictionary and can request that the user re-speak the utterance. For example, when the query understanding model has a high tolerance, the natural language understanding module may interpret the text "giggy" as "kitty." However, when the tolerance is low, the automated assistant may not match the term "giggy" with a term in the dictionary and request that the user repeat the utterance.

In some implementations, a STT processor may use a dedicated parsing module when processing the simplified grammar used by some users. In some such implementations, the dedicated parsing module may use STT models that are trained using training data that can include noisier (e.g., incomplete, grammatically ambiguous, etc.) training data. For example, in some implementations, the training data may be generated at least partially from data generated by users but transformed according to a model of other user's vocal tract forms and/or by adding noise to textual input to represent incomplete grammar.

Generally speaking, an automated assistant described herein may be more proactive when engaging with some users. For example, the automated system may be more willing to "guess" what a user's intent is. Additionally, the automated assistant may be more lax about requiring invocation phrases when the automated assistant detects vocal inputs from some users. Regarding resolution of the user's intent, various actions and/or information may not be suitable for some users. Accordingly, in various embodiments, based on the predicted user interacting with the automated assistant, the automated assistant may determine whether the intent of the user is resolvable. For example, if the user is determined to be a first user, the automated assistant may limit the online corpuses of data it can use to retrieve information responsive to the user's request to a "whitelist" of websites and/or away from a "blacklist" of websites. The same might apply, for instance, to music. If a first user utters, "play music!", the automated assistant may limit the music it plays to a library of music whitelisted for the first user. The automated assistant also may not require that the first user specify a playlist or artist, and may simply play music appropriate for the user's determined profile. By contrast, for a second user, the utterance "play music" may cause an automated assistant to seek additional information about what music to play. In some such implementations, the volume may be adjusted as well when the automated assistant determines that the request is from a first user. As another example, various actions, such as ordering goods/services through third party applications, may be disabled or blacked from certain users. Accordingly, when the automated assistant determines that it is engaging with a specific user, the automated assistant may refuse to perform various actions that might, for instance, cost money or require authorization.

Regarding outputting the results of resolving the user's intent, in various embodiments, the automated assistant may select, from a plurality of candidate voice synthesis models, a given voice synthesis model that is associated with the predetermined groups predicted for the user. For example, a default voice synthesis model employed by the automated assistant may be an adult voice that speaks at a relatively rapid pace (e.g., similar to real life conversation between adults). By contrast, a voice synthesis model employed by an automated assistant when engaged with some users that may speak at a relatively slower pace.

More or fewer details may be output by the automated assistant depending on the user. This may be accomplished, for instance, by making available a plurality of natural language generation models, each tailored to a particular classification of user. As an example, when engaged with a user determined to be between two and four, the automated assistant may employ a suitable natural language generation model to cause the automated assistant to use simple words and short sentences. As the determined vocabulary of the speaker increases, the vocabulary used by the automated assistant may grow (e.g., in accordance with the natural language generation model it selects) such that it uses longer sentences and more complex or advanced words. In some implementations, terms and/or phrases that normally would not require explanation to an adult may be more fully-explained by the automated assistant when engaged with a some users.

The natural language generation ("NLG") templates may include logic dictating that one natural language output be provided for a first user and another natural language output be provided for a second user. Thus, each user may hear output geared towards the respective user.

As another example, the automated assistant can summarize content, such as that of a webpage (or a portion of a webpage). For example, the user can often ask automated assistants random questions that might be answerable using an online encyclopedia entry. The automated assistant may employ various techniques to summarize the germane portions of the webpage into a coherent answer. Using techniques described herein, an automated assistant may identify the user or a profile associated with the user and determine, for example, a vocabulary level for use when summarizing germane portions of a webpage. In some embodiments, if the summarization is not only abstractive, but generative, it could even be powered by and/or combined with an automatic machine translation system.

FIG. 1 illustrates an example environment in which techniques disclosed herein may be implemented. The example environment includes one or more client computing devices 106. Each client device 106 may execute a respective instance of an automated assistant client 108. One or more cloud-based automated assistant components 119, such as a natural language understanding module 135, may be implemented on one or more computing systems (collectively referred to as a "cloud" computing system) that are communicatively coupled to client devices 106₁-N via one or more local and/or wide area networks 114 (e.g., the Internet).

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. Each user that engages with an automated assistant client 108 executing on a client device 106 may, in effect, engage with his or her own logical instance of an automated assistant 120. The term "automated assistant" as used herein as "serving" a particular user can refer to the combination of an automated assistant client 108 executing on a client device 106 operated by the user and one or more cloud-based automated assistant components 119 (which may be shared amongst multiple automated assistant clients 108). The automated assistant 120 can respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided.

The automated assistant 120 can engage in human-to-computer dialog sessions with one or more users via an interface input and output devices of one or more client devices 106. In some implementations, automated assistant 120 may engage in a human-to-computer dialog session with a user in response to input received via one or more user interface input devices, such as microphones, of one of the client devices 106. In some of those implementations, the user interface input can be directed to automated assistant 120. For example, a user may speak a predetermined invocation phrase, such as "OK, Assistant," or "Hey, Assistant," to cause automated assistant 120 to begin actively listening.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. The automated assistant 120 may utilize speech recognition to convert utterances (e.g., inputs) from users into text, and respond to the text accordingly, e.g., by providing search results, general information, and/or taking one or more responsive actions (e.g., playing media, launching a game, ordering food, etc.). The automated assistant 120 can respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of the client computing devices 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

The client computing device 106 may operate an automated assistant client 108. In various implementations, automated assistant client 108 may include a speech capture module 110, a proficiency detector 111, and/or an invocation module 112. In other implementations, one or more aspects of speech capture module 110, proficiency detector 111, and/or invocation module 112 may be implemented separately from automated assistant client 108, e.g., by one or more cloud-based automated assistant components 119. In various implementations, speech capture module 110 may interface with hardware such as a microphone to capture an audio recording of a user's utterance(s). Various types of processing may be performed on this audio recording for various purposes, as will be described below.

In various implementations, proficiency detector 111, which may be implemented using any combination of hardware or software, may be configured to analyze an audio recording captured by speech capture module 110 to make one or more determinations based on the user's evident speaking proficiency or characteristics of the vocal utterance. In some implementations, these determinations may include a prediction or estimation of the vocabulary ability or language proficiency within an input utterance, for instance, as a classification of the user into one of a plurality of groups. These determinations may include a prediction or estimation of vocabulary level of the user, or a classification of the user into one of a plurality of vocabulary levels. As will be described below, the determinations made by proficiency detector 111 may be used, e.g., by various components of automated assistant 120, to accommodate users of multiple different vocabulary levels.

Proficiency detector 111 may employ a variety of techniques to make determinations about the user's speaking proficiency. For example, in FIG. 1, proficiency detector 111 is communicatively coupled with a proficiency model database 113 (which may be integral with client device 106 and/or hosted remotely from client device 106, e.g., in the cloud). Proficiency model database 113 may include one or more artificial intelligence (or machine learning) models that are trained to generate output indicative of a user's speaking proficiency. In various implementations, the artificial intelligence (or machine learning) model may be trained to generate output indicative of a vocabulary ability or language proficiency of a vocal utterance based on one or more phonemes contained in the audio recording, a pitch of the user's voice detected in the audio recording, pronunciations, etc.

For example, a neural network may be trained (and stored in database 113) such that an audio recording of a user's utterance—or a feature vector extracted from the audio recording—may be applied as input to the neural network. In various implementations, the neural network may generate multiple outputs, each output corresponding to a vocabulary ability or language proficiency and associated probability. In some such implementations, the vocabulary ability or language proficiency having the highest probability may be used as a prediction of the vocabulary ability or language proficiency. Such a neural network may be trained using training examples in various forms, such as audio recordings (or feature vectors generated therefrom) labeled with the respective vocabulary abilities or language proficiencies. When a training example is applied across the network, a difference between the generated output and the label associated with the training example may be used, e.g., to minimize a loss function. Various weights of the neural network may then be adjusted, e.g., using standard techniques such as gradient descent and/or back propagation.

Speech capture module 110 may be configured to capture a user's speech, e.g., via a microphone. The speech capture module 110 may be further configured to convert that captured audio to text and/or to other representations or embeddings, e.g., using speech-to-text ("STT") processing techniques. The speech capture module 110 can convert text to computer-synthesized speech, e.g., using one or more voice synthesizers. However, because client device 106 may be relatively constrained in terms of computing resources (e.g., processor cycles, memory, battery, etc.), speech capture module 110 local to client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

In some implementations, client device 106 may include an invocation module 112 that is configured to determine whether a user's utterance qualifies as an invocation phrase that should initiate a human-to-computer dialog session with automated assistant 120. Once the vocabulary ability, language proficiency, or vocal characteristic of the input utterance is estimated by proficiency detector 111, in some implementations, invocation module 112 may analyze data indicative of the vocal utterance, such as an audio recording or a vector of features extracted from the audio recording (e.g., an embedding) in conjunction with the estimated vocabulary ability or characteristics of the utterance. In some implementations, a threshold that is employed by invocation module 112 to determine whether to invoke automated assistant 120 may be lowered with the estimated vocabulary ability falls into one or more vocabulary ability ranges. For example, responsive to identifying predetermined characteristics (e.g., frequency components) of the utterance, the invocation module 112 can set a lower threshold for invoking the automated assistant 120. In another example, when engaging with predetermined vocabulary abilities, a phrase such as "OK assisa," which is different from but somewhat phonetically similar to the proper invocation phrase, "OK assistant," nonetheless may be accepted as an invocation.

An on-device invocation model may be used by invocation module 112 to determine whether an utterance qualifies as an invocation. Such an on-device invocation model may be trained to detect common variations of invocation phrases. For example, in some implementations, the on-device invocation model (e.g., one or more neural networks) may be trained using training examples that each include an audio recording (or extracted feature vector) of the user's utterance. Some training examples may include a user's attempts to utter a proper invocation phrase; such training examples may be positive training examples. Additionally, in some implementations, some training examples may include other utterances from users that are not attempts to speak invocation phrases. These other training examples may be used as negative training examples. The (positive and/or negative) training examples may be applied as input across the on-device invocation model to generate output. The output may be compared to labels associated with the training examples (e.g., positive or negative) and the difference (error function) may be used to train the on-device invocation model, e.g., using techniques such as gradient descent and/or back propagation. In some implementations, if the on-device invocation model indicates that an utterance qualifies as an invocation, but a confidence score associated with the output is relatively low (e.g., because the utterance was generated by a user prone to mispronunciation), the low confidence score itself may be used, e.g., by proficiency detector 111, to estimate the vocabulary ability associated with the vocal utterance.

Cloud-based TTS module 116 may be configured to leverage the potentially much larger computing resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally. In some implementations, cloud-based TTS module 116 may be operably coupled with a database 115 that includes a plurality of voice synthesis models. Each voice synthesis model may be employed by automated assistant 120 to generate computer-speech that emulates a particular type of voice—e.g., a man, a woman, a cartoon character, speaker with a particular accent, etc.—when interacting with a user having a particular speaking proficiency and/or in a particular vocabulary ability group.

In some implementations, TTS module 116 may employ a particular voice synthesis model on demand. For example, suppose that automated assistant 120 is normally invoked with the phrase, "Hey Assistant." In some implementations, the model used to detect this phrase (e.g., the on-device invocation model described previously) may be modified, e.g., so that it responds to any utterance of "Hey, <entity>." In some such implementations, the requested <entity> may be used by TTS module 116 to select a voice synthesis model to employ. Thus, if a user invokes automated assistant by saying something like, "Hey, Virtual Assistant," then a voice synthesis modal associated with the entity "Virtual Assistant" may be employed.

Cloud-based STT module 117 may be configured to leverage the potentially much larger computing resources of the cloud to convert audio data captured by speech capture module 110 into text, which may then be provided to natural language understanding module 135. In various implementations, cloud-based STT module 117 may employ one or more custom parsers and/or STT models (sometimes referred to as "query understanding models") that are tailored towards interpreting vocal utterances that include predetermined vocal characteristics, limited or underdeveloped vocabularies, or limited or underdeveloped grammars.

For example, cloud-based STT module 117 may be operably coupled with one or more databases 118 that store a plurality of query understanding models. Each query understanding model may be configured for use with a particular vocabulary ability range. In some implementations, each query understanding model may include an artificial intelligence model (e.g., a neural network) that is trained to generate text from speech based on audio input (or data indicative of audio input, such as phonemes and/or other features of audio input extracted into a feature vector). The training data for such a model may include audio recordings from adults (or data indicative thereof) that has noise injected into it, e.g., labeled with the actual text of the speech. The training data may include audio recording from users with a predetermine vocabulary ability, labeled with the text of the user's speech.

In some implementations, cloud-based STT module 117 may convert an audio recording of speech to one or more phonemes, and then convert the one or more phonemes to text. The STT module 117 may employ a state decoding graph. In some implementations, STT module 117 may generate a plurality of candidate textual interpretations of the user's utterance. With conventional automated assistants 120, the candidate textual interpretation having the highest associated confidence score may be accepted as the user's free-form input, so long as the confidence score satisfied some threshold and/or had a confidence score that was sufficiently better than confidence scores associated with other candidate textual interpretations. Otherwise, automated assistant 120 might ask the user for clarification and/or disambiguation. With STT modules 117 configured with selected aspects of the present disclosure, such thresholds may be lowered. Consequently, automated assistant 120 may be more likely to attempt to satisfy a user's intent even if the user's utterance (e.g., a statement from a toddler) demonstrates grammatical/vocabularic deficiency.

Automated assistant 120 (e.g., cloud-based or client device-based portions) may include a natural language understanding module 135, a TTS module 116, a STT module 117, and other components that are described in more detail herein. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud).

In some implementations, automated assistant 120 generates or selects content in response to various inputs generated by a user of one of the client devices 1061-N during a human-to-computer dialog session with automated assistant 120. Automated assistant 120 may provide the content (e.g., over one or more networks when separate from a client device of a user) for presentation to the user as part of the dialog or other session. For example, automated assistant 120 may generate content in response to free-form natural language input provided via client device 106. The free-form input can be formulated by a user and may not be constrained to a group of options presented for selection by the user.

A "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

Natural language processor 122 of natural language understanding module 135 processes natural language input generated by users via client device 106 and may generate annotated output (e.g., in textual form) for use by one or more other components of automated assistant 120. For example, the natural language processor 122 may process natural language free-form input that is generated by a user via one or more user interface input devices of client device 1061. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 can include an entity tagger to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph. In some implementations, the knowledge graph may include nodes that represent known entities (and in some cases, entity attributes), as well as edges that connect the nodes and represent relationships between the entities. For example, a "banana" node may be connected (e.g., as a child or dependent node) to a "fruit node," which in turn may be connected (e.g., as a child or dependent node) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing relationship or link) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 can include a coreference resolver to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, the named entity tagger may rely on annotations from the coreference resolver and/or dependency parser in annotating mentions to a particular entity. Also, for example, the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Natural language understanding module 135 may also include an intent matcher 136 to determine an intent of a user engaged in a human-to-computer dialog session with automated assistant 120. While depicted separately from natural language processor 122 in FIG. 1, in other implementations, intent matcher 136 may be an integral part of natural language processor 122 (or more generally, of a pipeline that includes natural language processor 122). In some implementations, natural language processor 122 and intent matcher 136 may collectively form the aforementioned "natural language understanding" module 135.

Intent matcher 136 may use various techniques to determine an intent of the user, e.g., based on output from natural language processor 122 (which may include annotations and terms of the natural language input). In some implementations, intent matcher 136 may have access to one or more databases 137 that include, for instance, a plurality of mappings between grammars and responsive actions (or more generally, intents). In some cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?" In addition to or instead of grammars, intent matcher 136 may employ one or more trained machine learning models, alone or in combination with one or more grammars. These trained machine learning models may also be stored in one or more databases 137, and may be trained to identify intents, e.g., by embedding data indicative of a user's utterance into a reduced dimensionality space, and then determine which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Users can provide the slot values proactively. For example, for a grammar "Order me a <topping> pizza," a user may likely speak the phrase "order me a sausage pizza," in which case the slot <topping> is filled automatically. If a user invokes a grammar that includes slots to be filled with slot values, without the user proactively providing the slot values, automated assistant 120 may solicit those slot values from the user (e.g., "what type of crust do you want on your pizza?").

In some implementations, automated assistant 120 may facilitate (or "broker") transactions between users and agents, which may be independent software processes that receive input and provide responsive output. Some agents may take the form of third party applications that may or may not operate on computing systems that are separate from those that operate, for instance, cloud-based automated assistant components 119. One kind of user intent that may be identified by intent matcher 136 is to engage a third party application. For example, automated assistant 120 may provide access to an application programming interface ("API") to a pizza delivery service. A user may invoke automated assistant 120 and provide a command such as "I'd like to order a pizza." Intent matcher 136 may map this command to a grammar (which may be added to database 137 in some cases by the third party) that triggers automated assistant 120 to engage with the third party pizza delivery service. The third party pizza delivery service may provide automated assistant 120 with a minimum list of slots that need to be filled in order to fulfill a pizza delivery order. Automated assistant 120 may generate and provide to the user (via client device 106) natural language output that solicits parameters for the slots.

In various implementations, intent matcher 136 may have access to, e.g., in database 137, a library of multiple sets of grammars and/or trained models. Each set of grammars and/or model may be designed to facilitate interaction between automated assistant 120 and a user of a particular vocabulary level. In some implementations, these grammars and/or models may be part of the aforementioned "query understanding models," in addition to or instead of the models described above in relation to STT module 117 (e.g., stored in database 118). A query understanding model may include components used during both STT processing and intent matching. In some implementations, a query understanding model may include components used only during STT processing. In some implementations, a query understanding model may include components used only during intent matching and/or natural language processing. Any combination of these variations is contemplated herein. If query understanding models are employed during both STT processing and intent matching, then in some implementations, databases 118 and 137 may be combined.

As an example, a first set of grammars and/or model (or "query understanding model") stored in database 137 may be configured to facilitate interaction with users of a first vocabulary level. In some such implementations, such a set of grammars/model may have a relatively high tolerance for errors in grammar, vocabulary, pronunciation. Another set of grammars and/or model may be configured to facilitate engagement with users of a second vocabulary level. Such a set of grammars and/or model may have a slightly lower tolerance for errors, though it still may be relatively lenient. Another set of grammars and/or model may be configured to facilitate engagement with a third set of users with a third vocabulary level may be even less tolerant of errors. Another set of grammars and/or model may be configured to facilitate "normal" engagement with relatively proficient speakers—tolerance for errors in grammar, vocabulary, and/or pronunciation may be relatively low for such a set of grammars/model.

Fulfillment module 124 may be configured to receive the predicted/estimated intent that is output by intent matcher 136, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or data) to be generated/obtained, e.g., by fulfillment module 124. As will be described below, the fulfillment information may in some implementations be provided to a natural language generator ("NLG") 126, which may generate natural language output based on the fulfillment information.

Fulfillment information may take various forms because an intent can be fulfilled in a variety of ways. Suppose a user requests pure information, such as "Where were the outdoor shots of 'The Shining' filmed?" The intent of the user may be determined, e.g., by intent matcher 136, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oreg." This responsive information may form part of the fulfillment information generated by fulfillment module 124.

The fulfillment module 124 may be configured to receive, e.g., from natural language understanding module 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

In some implementations, and similar to other components herein such as STT module 117 intent matcher 136, fulfillment module 124 may have access to a database 125 that stores a library of rules, heuristics, etc., that are geared towards various vocabulary levels. For example, database 125 may store one or more whitelists and/or blacklists of websites, universal resource identifiers (URI), universal resource locators (URL), domains, etc., that dictate what a user can, and cannot access depending on their profile. Database 125 may also include one or more rules that dictate how and/or whether a user is able to cause automated assistant 120 to engage with a third party application, which as noted above can be used to, for instance, order goods or services.

The natural language generator 126 can generate and/or select natural language output (e.g., words/phrases that are designed to mimic human speech) based on data obtained from various sources. In some implementations, natural language generator 126 can receive, as input, fulfillment information associated with fulfillment of an intent, and to generate natural language output based on the fulfillment information. The natural language generator 126 may receive information from other sources, such as third party applications (e.g., required slots), which it may use to compose natural language output for the user.

If a user's intent is to search for general information, then natural language generator 126 may generate natural language output that conveys information responsive to the user's, e.g., in sentence form. In some instances, the natural language output may be extracted, e.g., by natural language generator 126, unaltered from documents (e.g., because it is already in complete sentence form) and provided as is. The responsive content may not be in complete sentence form (e.g., a request for today's weather may include a high temperature and chance of precipitation as standalone pieces of data), in which case natural language generator 126 may formulate one or more complete sentences or phrases which presents the responsive content as natural language output.

In some implementations, natural language generator 126 can use "natural language generation templates" (or "NLG templates") to generate natural language output. In some implementations, NLG templates may be stored in database 127. NLG templates may include logic (e.g., if/else statements, loops, other programming logic) that dictates formulation of natural language output in response to various information from various sources, such as pieces of data included with fulfillment information generated by fulfillment module 124. Thus, in some ways an NLG template may, in effect, constitute a state machine, and may be created using any known programming language or other modeling language (e.g., Unified Modeling Language, Specification and Description Language, extensible markup language, etc.).

As an example, an NLG template may be configured to respond to English language requests for weather information. The NLG template may dictate which of a plurality of candidate natural language outputs are provided under a plurality of circumstances. For example, suppose fulfillment information generated by fulfillment module 124 indicates that the temperature will be above, say, 80 degrees Fahrenheit and there will be no clouds. Logic set forth in the NLG template (e.g., if/else statements) may dictate that the natural language output selected by natural language generator 126 be a phrase such as "It's gonna be a scorcher, don't forget your sunglasses." Suppose fulfillment information generated by fulfillment module 124 indicates that the temperature will be below, say, 30 degrees Fahrenheit and there will be snow. Logic set forth in the NLG template may dictate that the natural language output selected by natural language generator 126 be a phrase such as "It's gonna be chilly, you might want a hat and gloves, and be careful on the road," for example.

In some implementations, NLG templates may include logic that is influenced by the detected vocabulary level, vocal characteristic, or grammar level of the user. For example, an NLG template may have logic that causes a first natural language output to be provided if the user is predicted to be within a first vocabulary ability range, and a second natural language output to be provided if the user is predicted to be within another vocabulary ability range. An NLG template may have logic that causes a first natural language output to be provided if a first frequency characteristic is detected in the vocal utterance and a second natural language output to be provided if a second frequency characteristic is detected in the vocal utterance. The first natural language output may use more explanatory words and/or phrases, with simpler language, for example. The second natural language output more succinct responses based on the NLG template's assumption that the user does not need as much explanation.

In the weather example above, users with different vocabulary levels may be provided different responses based on the logic in the NLG template. For example, if the weather will be cold, a first user with a first vocabulary level may be provided additional information or content that is not provided to a second user with a second vocabulary level.

The system of the automated assistant can include a digital component provider device 152. The digital component provider device 152 can provide audio, visual, or multimedia based digital components (which can also be referred to as content) for presentation by the client device 106 as an audio output digital component or visual output digital component. The digital component can be or include other digital components. The digital component can be or include a digital object. The digital component can be configured for a parametrically driven text to speech technique. The digital component can be configured for text-to-speech (TTS) implementations that convert normal language text into speech. The digital component can be input to an application programming interface that utilizes a speech-synthesis capability to synthesize text into natural-sounding speech in a variety of languages, accents, and voices. The digital component can be coded as plain text or a speech synthesis markup language (SSML). SSML can include parameters that can be set to control aspects of speech, such as pronunciation, volume, pitch, or rate that can form an acoustic fingerprint or native voice.

The digital component provider device 152 can provide selection criteria for the digital component, such as a value, keyword, concept, or other metadata or information to facilitate a content selection process. The digital component provider device 152 can also provide audio based digital components (or other digital components) to the content selector component 154 where they can be stored in a data repository. The content selector component 154 can select the audio digital components (or digital components configured for a parametrically driven text, image, or video to speech technique) and provide (or instruct the digital component provider device 152 to provide) the audio digital components to the client device 106. The audio based digital components can be exclusively audio or can be combined with text, image, or video data.

The digital component provider device 152 can provide the digital component to the content selector component 154 for storage in the data repository in a content data structure. The content selector component 154 can retrieve the digital component responsive to a request for content from the client device 106. The digital component provider device 152 can establish a digital component campaign (or electronic content campaign). A digital component campaign can refer to one or more content groups that correspond to a common theme. A content campaign can include a hierarchical data structure that includes content groups, digital component data objects (e.g., digital components or digital objects), and content selection criteria. To create a digital component campaign, digital component provider device 152 can specify values for campaign level parameters of the digital component campaign. The campaign level parameters can include, for example, a campaign name, a preferred content network for placing digital component objects, a value of resources to be used for the digital component campaign, start and end dates for the content campaign, a duration for the digital component campaign, a schedule for digital component object placements, language, geographical locations, type of computing devices on which to provide digital component objects. In some cases, an impression can refer to when a digital component object is fetched from its source and is countable. Due to the possibility of click fraud, robotic activity can be filtered and excluded, as an impression. Thus, an impression can refer to a measurement of responses from a Web server to a page request from a browser, which is filtered from robotic activity and error codes, and is recorded at a point as close as possible to opportunity to render the digital component object for display on the client device 106. In some cases, an impression can refer to a viewable or audible impression; e.g., the digital component object or digital component is at least partially (e.g., 20%, 30%, 30%, 40%, 50%, 60%, 70%, or more) viewable on a display device of the client device 106, or audible via a speaker of the client device 106. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The digital component provider device 152 can establish one or more content groups for a digital component campaign. A content group includes one or more digital component objects and corresponding content selection criteria, such as keywords, words, terms, phrases, vocabulary levels, geographic locations, type of computing device, time of day, interest, topic, or vertical. Content groups under the same content campaign can share the same campaign level parameters, but may have tailored specifications for content group level parameters, such as keywords, negative keywords (e.g., that block placement of the digital component in the presence of the negative keyword on main content), vocabulary levels, or parameters associated with the content campaign.

To create a new content group, the digital component provider device 152 can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the digital component provider device 152 can use to capture a topic or subject matter for which digital component objects of the content group is to be selected for display. For example, a food and beverage company can create a different content group for each brand of food or beverage it carries, and may further create a different content group for each model of vehicle it carries. Examples of the content group themes that the food and beverage company can use include, for example, "Brand A cola", "Brand B ginger ale," "Brand C orange juice," "Brand D sports drink," or "Brand E purified water." An example content campaign theme can be "soda" and include content groups for both "Brand A cola" and "Brand B ginger ale", for example. The digital component (or digital component object or digital component) can include "Brand A", "Brand B", "Brand C", "Brand D" or "Brand E". The digital component object or digital component can refer to the digital component configured for a parametrically driven text to speech technique.

The digital component provider device 152 can provide one or more keywords and digital component objects to each content group. Keywords can include terms that are relevant to the product or services of associated with or identified by the digital component objects. A keyword can include one or more terms or phrases. For example, the food and beverage company can include "soda," "cola," "soft drink," as keywords for a content group or content campaign that can be descriptive of the goods or services the brand provides. In some cases, negative keywords can be specified by the content provider to avoid, prevent, block, or disable content placement on certain terms or keywords. The content provider can specify a type of matching, such as exact match, phrase match, or broad match, used to select digital component objects.

The digital component provider device 152 can provide the one or more keywords to be used by the content selector component 154 to select a digital component object provided by the digital component provider device 152. The digital component provider device 152 can provide additional content selection criteria to be used by the content selector component 154 to select digital component objects. The content selector component 154 can run a content selection process involving multiple content provider devices 152 responsive to receiving an indication of a keyword of an electronic message.

The digital component provider device 152 can provide one or more digital component objects for selection by the content selector component 154. The content selector component 154 can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. Upon selecting a digital component, the content selector component 154 can transmit the digital component object for presentation or rendering on a client device 106 or display device of the client device 106. Presenting or rendering can include displaying the digital component on a display device, or playing the digital component via a speaker of the client device 106. The content selector component 154 to present or render the digital component object. The content selector component 154 can instruct the client device 106 to generate audio signals, acoustic waves, or visual output. For example, the automated assistant client 108 can present the selected digital component via an audio output.

The digital component provider device 152 can select the digital component based on an intent, the vocabulary level, or other characteristic (e.g., characteristics such as phonemes, pitch, frequency components, and cadence) of an utterance that included the request to which the digital component is being provided. The natural language processor 122 can determine a request, such as a content request, within utterance (which can be referred to as an audio input request) received from the client device 106. The content selector component 154 can be a part of the could-based automated assistant component 119 or separate from the could-based automated assistant component 119. The content selector component 154 can receive the content request or an indication thereof. The content selector component 154 can receive prior audio inputs (or packaged data object) for the selection of a digital component based on the content request. The content selector component 154 execute a real-time digital component selection process to select the digital component. The content selector component 154 can select addition or supplemental digital components based on the input request.

The real-time digital component selection process can refer to, or include, selecting digital component objects (which may include sponsored digital component objects) provided by third party content provider devices 152. The real-time content selection process can include a service in which digital components provided by multiple content providers are parsed, processed, weighted, or matched based on the packaged data object in order to select one or more digital components to provide to the client device 106. The content selector component 154 can perform the content selection process in real-time. Performing the content selection process in real-time can refer to performing the content selection process responsive to the request for content received via the client device 106. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client device 106, or within a time interval after the communication session is terminated.

For example, the content selector component 154 can be designed, constructed, configured or operational to select digital component objects based on the content request in the input audio signal. The content selector component 154 can identify, analyze, or recognize voice, audio, terms, characters, text, symbols, or images of the candidate digital components using an image processing technique, character recognition technique, natural language processing technique, or database lookup. The candidate digital components can include metadata indicative of the subject matter of the candidate digital components, in which case content selector component 154 can process the metadata to determine whether the subject matter of the candidate digital component corresponds to the content request.

Responsive to the request identified in the input audio (or other) signal, the content selector component 154 can select a digital component object from a database associated with the digital component provider device 152 and provide the digital component for presentation via the client device 106. The digital component object can be provided by a digital component provider device 152. The content selector component 154 can select multiple digital components. The multiple digital components can be provided by different digital component provider devices 152. For example, a first digital component provider device 152 can provide a primary digital component responsive to the request and a second digital component provider device 152 can provide a supplemental digital component that is associated with or relates to the primary digital component. The client device 106 or a user thereof can interact with the digital component object. The client device 106 can receive an audio, touch, or other input response to the digital component. The client device 106 can receive an indication to select a hyperlink or other button associated with the digital component object that causes or allows the client device 106 to identify digital component provider device 152, request a service from the digital component provider device 152, instruct the digital component provider device 152 to perform a service, transmit information to the digital component provider device 152, or otherwise identify a good or service associated with digital component provider device 152.

The content selector component 154 can select a digital component that includes text, strings, or characters that can be processed by a text to speech system or presentable via a display. The content selector component 154 can select a digital component that is in a parameterized format configured for a parametrically driven text to speech technique. The content selector component 154 can select a digital component that is in a format configured for display via client device 106. The content selector component 154 can provide the selected digital component to the client device 106 or automated assistant client 108 or application executing on the client device 106 for presentation by the client device 106.

Figure 2:
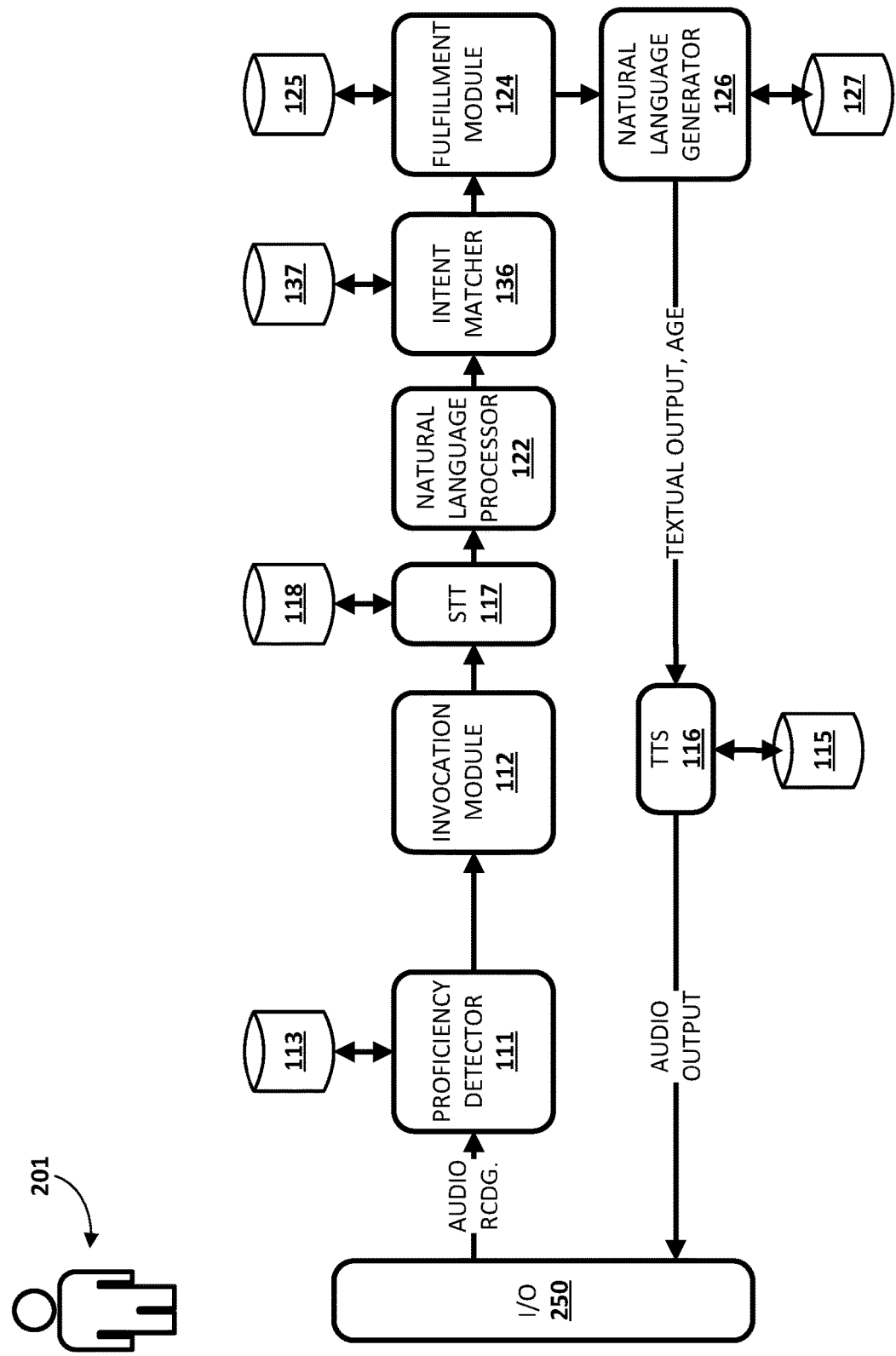
FIG. 2 depicts an example process flow that demonstrates various aspects of the present disclosure, in accordance with various implementations.

FIG. 2 demonstrates an example of how an utterance from a user 201 may be processed through the various components of FIG. 1, depending on the predicted/estimated vocabulary level of user 201. Components that are relevant to techniques described herein are depicted, but this is not meant to be limiting, and various other components not depicted in FIG. 2 may be used as part of processing the user's utterance.

When the user provides a vocal utterance, input/output ("I/O") component(s) of the client device 106 operated by user 201, such as a microphone, may capture the user's utterance as an audio recording ("AUDIO RCDG." in FIG. 2). The audio recording may be provided to proficiency detector 111, which as described above predicts and/or estimates an a vocabulary level of user 201.

The vocabulary level is then provided to invocation module 112. Based on the estimated vocabulary level and data indicative of the user's utterance (e.g., audio recording, feature vector, embedding), invocation module 112 may classify the user's utterance as intended, or not intended, to trigger automated assistant 120. As noted above, a threshold that must be satisfied in order for invocation module 112 to classify the utterance as a proper invocation may be lowered for a user having a relatively low vocabulary level.

In some implementations, the threshold employed by invocation module 112 may be lowered based on other signals as well, such as detected ambient noise, motion (e.g., driving a vehicle), etc. One reason for lowering the threshold based on these other signals is that when these other signals are detected, there may be more noise present in the user's utterance than if the user's utterance were made in a quiet environment. Under such circumstances, especially if the user is driving or riding a bike, it may be desirable for automated assistant 120 to be more easily invoked.

Still referring to FIG. 2, once automated assistant 120 is triggered, STT module 117 may use the audio recording (or data indicative of the user's utterance) in conjunction with the estimated vocabulary level to select one or more thresholds and/or models (e.g., from database 113). The thresholds and models may be part of a "query understanding model." STT module 117 may generate, as output, a textual interpretation of the user's utterance. This textual interpretation may be provided to natural language processor 122, which annotates and/or otherwise processes the textual interpretation as described above. The output of natural language processor 122, along with the estimated vocabulary level of user 201, is provided to intent matcher 136.

Intent matcher 136 may select, e.g., from database 137, one or more grammars and/or models based on the detected/predicted vocabulary level of user 201. In some implementations, some intents may be unavailable due to the predicted/estimated vocabulary level of user 201. For example, intents that involve automated assistant 120 interacting with third party applications—particularly third party applications that require the expenditure of funds and/or that otherwise are not appropriate for some users—may not be permitted, e.g., by one or more rules stored in database 137, when the user's estimated vocabulary level is determined to be, for instance, below a threshold. These rules may be stored and/or implemented elsewhere, e.g., in database 125.

The intent determined by intent matcher 136, along with the estimated or vocabulary level and any user-provided slot values (if applicable), may be provided to fulfillment module 124. Fulfillment module 124 may fulfill the intent in accordance with various rules and/or heuristics stored in database 125. The fulfillment information generated by fulfillment module 124 may be passed to natural language generator 126, e.g., along with the user's estimated vocabulary level. Natural language generator 126 may be configured to generate natural language output in accordance with the fulfillment information and the user's estimated vocabulary level. For example, and as described previously, natural language generator 126 may implement one or more NLG templates that include logic that depends on the user's estimated vocabulary level to generate natural language output.

The textual output generated by natural language generator 126, along with the user's estimated vocabulary level, may be provided to TTS module 116. TTS module 116 may select, from database 115 based on the user's estimated vocabulary level, one or more voice synthesizers to be used by automated assistant 120 to convey the audio output to the user. The audio output generated by TTS module 116 may be provided to one or more I/O components 250 of the client device operated by user 201, so that it may be output audibly via one or more speakers and/or visually on one or more displays.

Figure 3A:
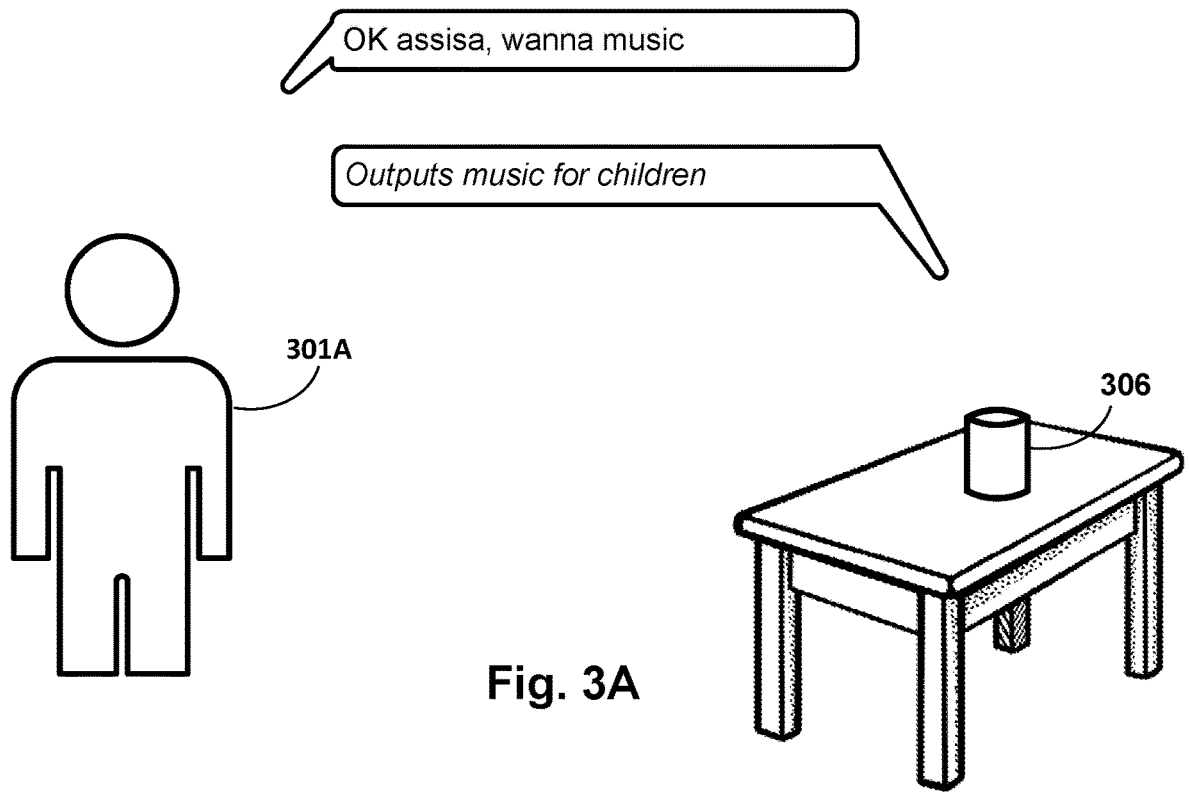
FIGS. 3A and 3B depict example dialogs between a user and an automated assistant, in accordance with various implementations.
Figure 3B:
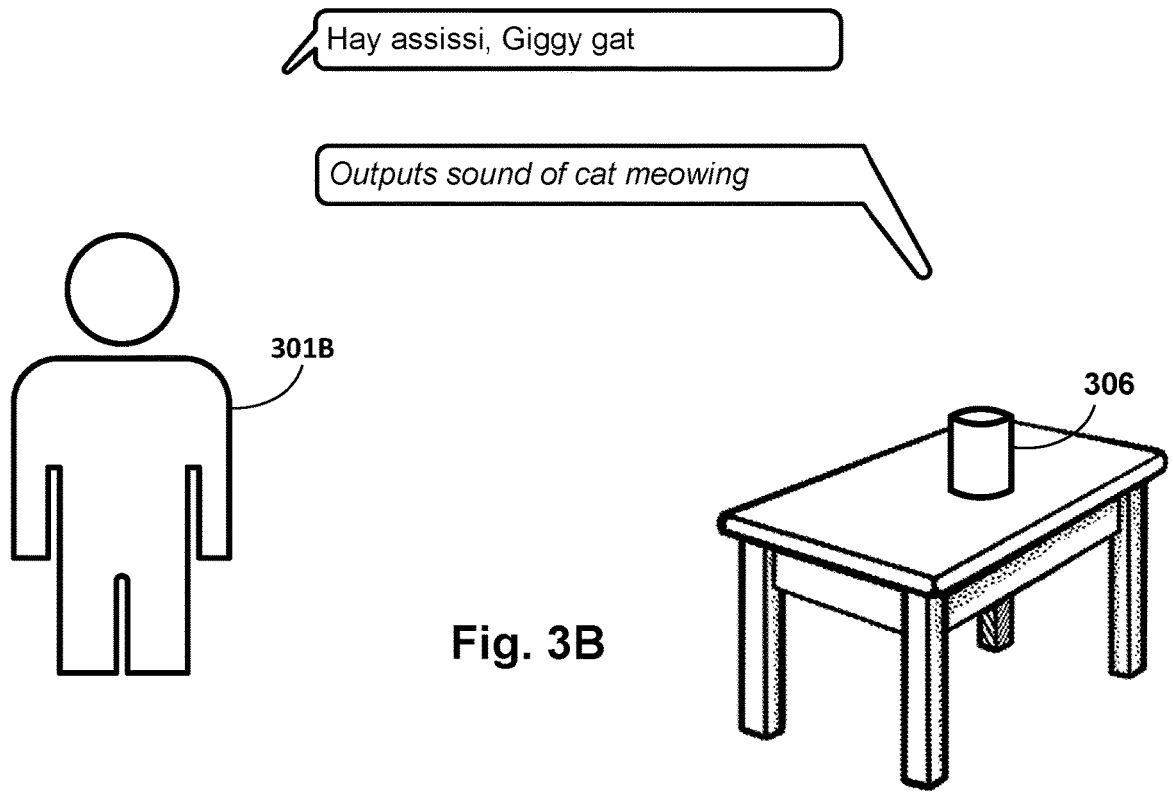

FIGS. 3A and 3B depict example scenarios in which techniques described herein may be employed. In FIG. 3A, a first user 301A has a first vocabulary level and is attempting to engage with automated assistant 120 that operates at least in part on a client device 306. In this example, client device 306 takes the form of an assistant device, and more specifically, a standalone interactive speaker, but this is not meant to be limiting.

First user 301A says, "OK, Assisa, wanna music," which may be captured as an audio recording and/or as a vector of features extracted from the audio recording. Automated assistant 120 may first estimate a vocabulary level of user 301A based on the audio recording/feature vector. In some implementations, proficiency detector 111 may analyze features such as phonemes, pitch, frequency components, cadence, etc., to estimate the vocabulary level or other characteristics of the captured audio (e.g., vocal utterance) of the user 301A. The audio recording may be processed by other components of automated assistant 120, such as STT module 117, to generate a textual interpretation of the user's utterance. This textual interpretation may be analyzed, e.g., by proficiency detector 111, to estimate/predict grammatical and/or vocabularic proficiency of user 301A.

Once automated assistant 120 has been invoked, it may analyze the remainder of the utterance from user 301A, "Wanna music." Without modification (or selection) of the models and thresholds for parsing and understanding input, such a phrase might cause an example automated assistant to seek disambiguation and/or clarification from user 301A. However, by selecting the models or thresholds based on the vocal characteristics of the vocal utterance, automated assistant 120 can have a tolerance for grammatical, vocabulary, and/or pronunciation errors that is higher than when compared to instances when the models and thresholds for understanding inputs are not selected based on vocal and other characteristics of the vocal utterance. Consequently, and using a process described herein, various components of automated assistant 120 may use the estimated vocabulary level to select, at different points in the pipeline of FIG. 2, various models, rules, grammars, heuristics, etc., to process and fulfill the user's request. In this case, automated assistant 120 may respond by outputting a response selected based on the vocabulary level of the user.

FIG. 3B depicts another example with another user 301B interacting with automated assistant 120 using client device 306. In this example, user 301B speaks an utterance, "Hay assissi, Giggy gat." Automated assistant 120 can estimate/predict that user 301B is in a low vocabulary level. Consequently, automated assistant 120 can select models and thresholds to be more tolerant of grammatical, vocabulary, and/or pronunciation errors. For example, the automated assistant 120 can select models and thresholds such that the phrase "giggy gat" may be more permissively interpreted as "kitty cat" rather than requesting disambiguation from the user.

Moreover, if second user where to invoke automated assistant 120 and simply say, "kitty cat," automated assistant 120 may not be able to respond because the second user's intent is unclear. However, using techniques described herein, automated assistant 120, e.g., by way of intent matcher 136 and/or fulfillment module 124, may determine, based on this interpretation and the estimated vocabulary level of user 301B, the intent of user 301B as being to hear the sound a cat makes. As a result, automated assistant 120 may output the sound of a cat meowing.

Figure 4A:
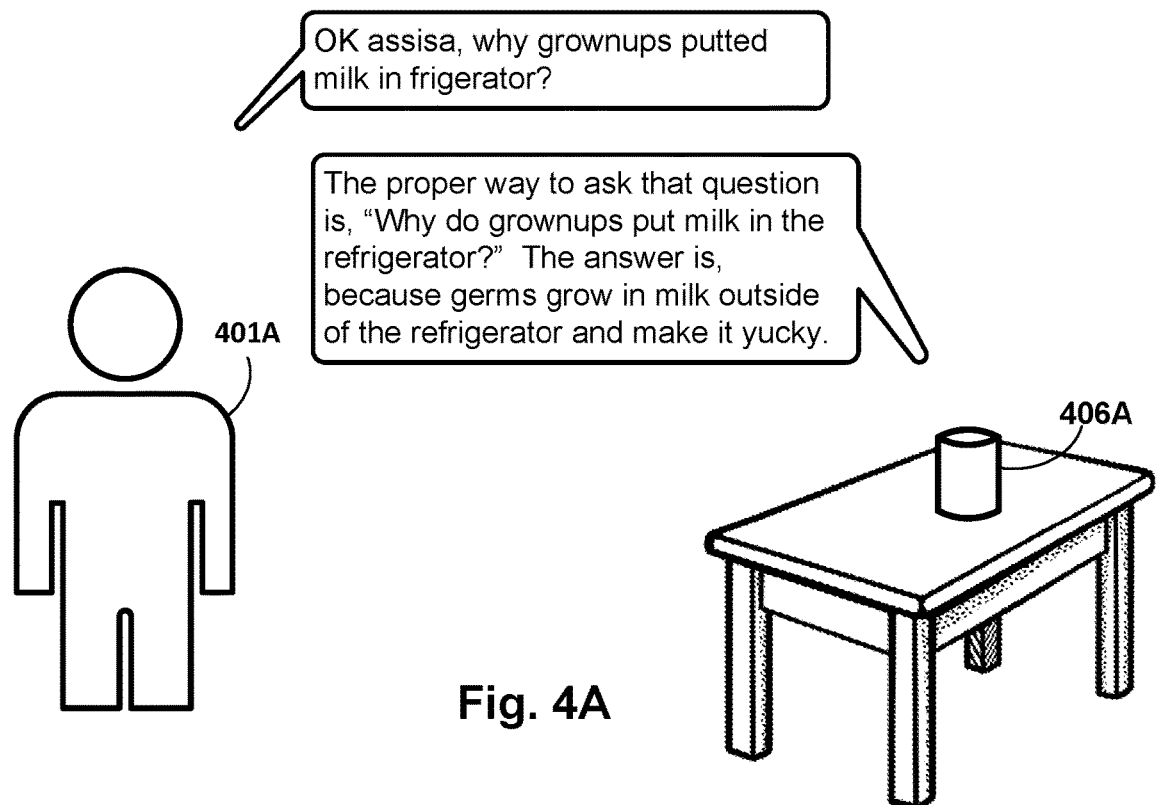
FIGS. 4A and 4B depict example dialogs between a user and an automated assistant, in accordance with various implementations.

FIG. 4A depicts an example of a user 401A interacting with automated assistant 120 operating at least in part on client device 406A, which takes the form of an assistant device, and more specifically, a standalone interactive speaker. In this example, user 401A asks, "OK assisa, why putted milk in frigerator?" Such a question may not be interpretable by a conventional automated assistant due to its various grammatical and vocabulary errors, as well as the various mispronunciations. However, by selecting the understanding model and thresholds based on the vocabulary level or other characteristics of the input, the automated assistant 120 can be more tolerant of such errors, and therefore may be able to process the question from user 401A. Additionally, in some implementations, automated assistant 120 may be configured to teach user 401A proper grammar and/or vocabulary. This is equally true whether the user for which the language used by automated assistant 120 is non-native.

As illustrated in FIG. 4A, before answering the user's question, automated assistant 120 states, "The proper way to ask that question is, 'Why do people put milk in the refrigerator?'" This statement is meant to guide user 401A as to proper grammar, vocabulary, and/or pronunciation. In some implementations, automated assistant 120 may monitor a particular user's utterances over time to determine whether the user's vocabulary is improving. In some such implementations, if the user demonstrates an increased vocabulary level from one dialog session to the next, automated assistant 120 may congratulate the user or otherwise provide encouragement, e.g., for the user to continue to improve linguistically.

Once automated assistant 120 has provided user 401A with linguistic guidance, automated assistant 120 can provide information (e.g., obtained from one or more websites by fulfillment module 124) that is responsive to the user's query, but in a manner that is selected based on the estimated vocabulary of user 401A. In this example, automated assistant 120 explains, "because germs grow in milk outside of the refrigerator." This may be accomplished in various ways. In some implementations, a component such as fulfillment module 124 and/or natural language generator 126 may—based on an estimation of the user's vocabulary level—replace relatively complex words such as "bacteria," "spoil," "perishable," or "curdle" with simpler terms such as "germs" and "go bad." Had a second user with a higher vocabulary level asked the same question, automated assistant 120 may have generated an answer such as, "Milk is a perishable food and therefore is at risk when kept outside a refrigerator. Milk must be stored in a refrigerator set to below 40° F. for proper safety." In other implementations, one or more NLG templates might be employed to influence the output towards the estimated vocabulary level of user 401A.

In some implementations, a variety of different functionalities may be made available (or blocked) depending on the user's vocabulary level or other characteristics of the vocal utterance. For example, in some implementations, a variety of games or other activities can be blacklisted or whitelisted based on the user's vocabulary level or characteristics of the vocal utterance.

Figure 4B:
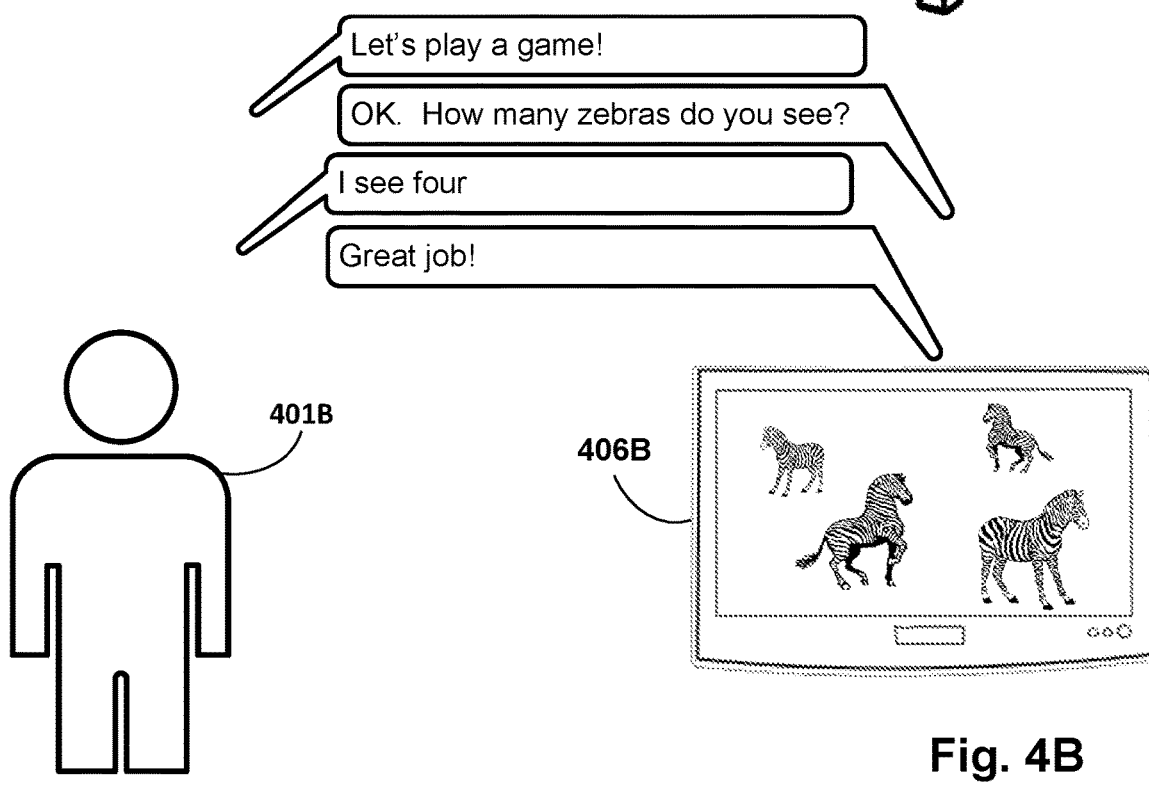

FIG. 4B depicts another example scenario in which a user 401B interacts with automated assistant 120. In this example, automated assistant 120 operates at least in part on a client device 406B taking the form of a smart television or a standard television equipped with a digital media player dongle.

In this example, user 401B utters, "Let's play a game." Based on the user's predicted vocabulary level, automated assistant 120 may select a game to play, e.g., randomly from a group of games tailored towards the vocabulary level of user 401B and/or stochastically from all games (with games geared towards the vocabulary level of user 401B weighted more heavily). The automated assistant 120 can present the user 401B with a list (e.g., visually on client device 406B) of games that are appropriate for user 401B.

For example, as part of the selected game, automated assistant 120 can cause client device 406B to render four zebras (e.g., still images, animations, etc.) visually on its display. Automated assistant 120 asks, "How many zebras do you see?" After counting, user 401B responds, "I see four." In other implementations, user could say something like "I see this many," and hold up her fingers. Automated assistant 120 may, e.g., by analyzing a digital image captured by a camera of client device 406B, count the fingers. In either example, automated assistant 120 may determine that "four" matches the number of rendered zebras, and may respond, "Great job!"

In FIG. 4B, user 401B engages with automated assistant 120 using the smart television (or standard television equipped with a smart television dongle). However, this is not meant to be limiting. In other implementations, user 401B may engage with automated assistant 120 using a different client device, such as a standalone interactive speaker, and the visual aspects of this example may nonetheless be rendered on a television screen. For example, the smart television and the interactive standalone speaker may be part of the same coordinated "ecosystem" of client devices that are, for instance, controlled by a single user (e.g., a parent or head-of-household) or associated with all members of a family (or other group such as co-workers, neighbors, etc.).

In some implementations, detected/predicted/estimated characteristics of the input vocal utterance may be used, e.g., by automated assistant 120, as slot values for use in performing various tasks. These tasks may include, for instance, automated assistant 120 engaging with one or more "agents." The "agents" may refer to processes that receive, e.g., from automated assistant or elsewhere, input such as slot values, intents, etc., and provide output in response. A web service is one example of an agent. Third party applications can be agents. The agent may use the slot value provided by automated assistant for various purposes, such as fulfilling the user's request.

Figure 5A:
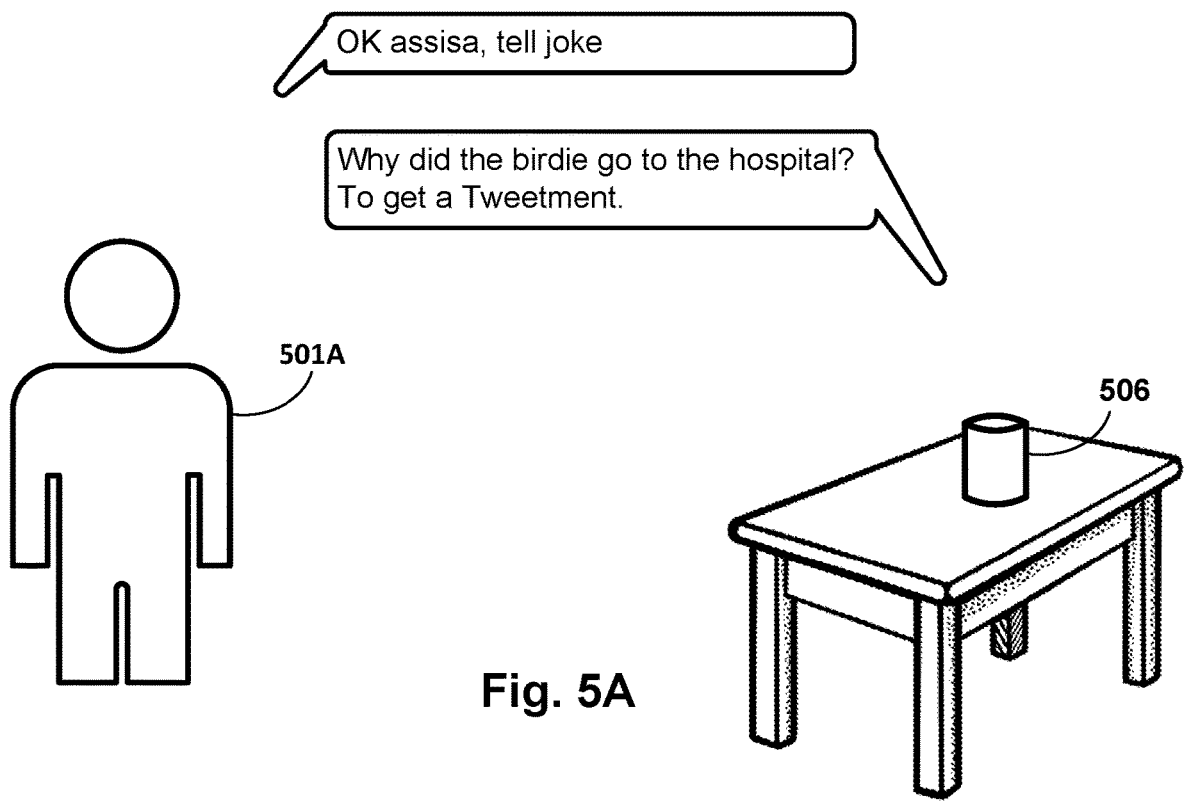
FIGS. 5A and 5B depict example dialogs between a user and an automated assistant, in accordance with various implementations.
Figure 5B:
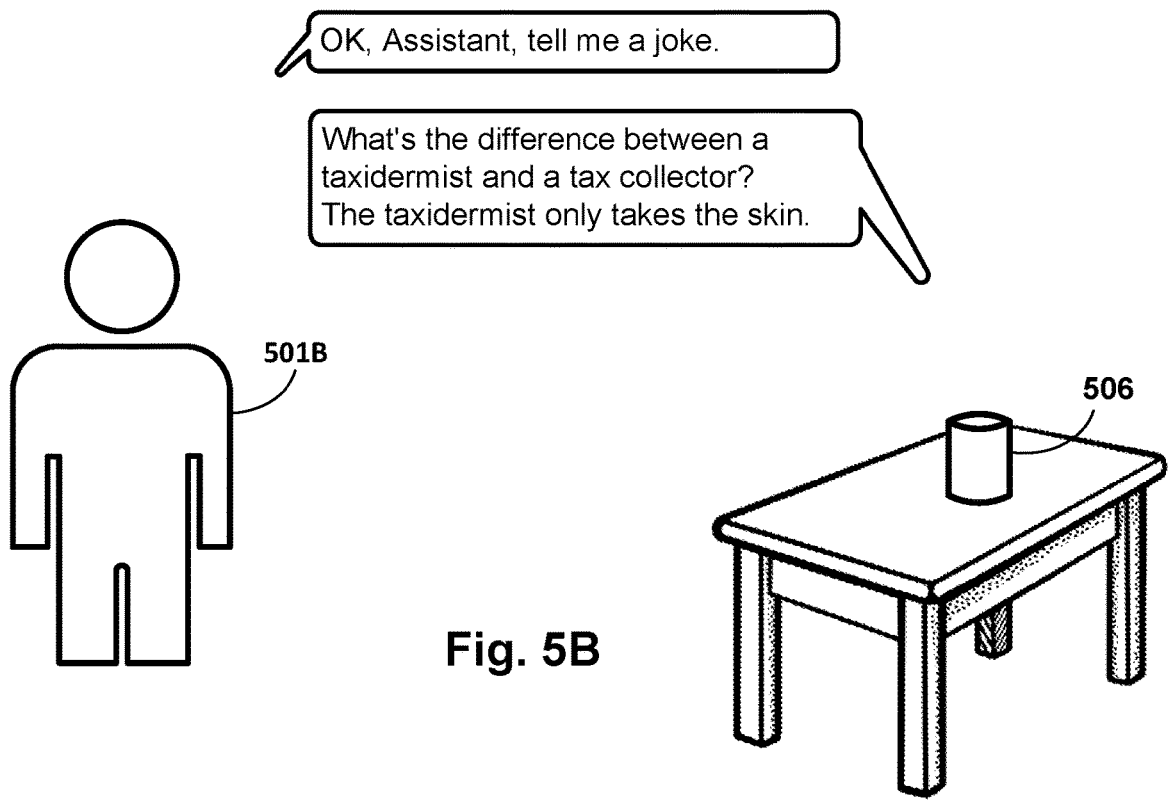

FIGS. 5A and 5B depict one example of how a vocabulary level may be used as a slot value that causes different responses to be elicited from the same agent, which in this example is a third party application in the form of a joke service. In this example, the third party agent accepts a slot value indicative of the user's vocabulary level, and selects an appropriate joke based at least in part on that slot value. That way, jokes told by automated assistant 120 are audience-appropriate.

In FIG. 5A, a relatively low vocabulary level can be detected in the utterance provided by the user 501A. Accordingly, when user 501A asks for a joke, automated assistant 120 executing at least in part on client device 506 (taking the form once again of a standalone interactive speaker) provides the user's predicted/estimated vocabulary level to the third party joke services. The joke service selects and provides, for output by automated assistant 120, a joke that is vocabulary level-appropriate.

Contrast that to FIG. 5B, a relatively high vocabulary level can be detected in the utterance provided by the user 501B. In this example, user 501B makes the exact same request: "OK, Assistant, tell me a joke." Because the utterance from user 501B is better formed grammatically correct, or includes different frequency components than the utterance by user 501A in FIG. 5A, user 501B is identified as having a relatively high vocabulary level. Consequently, user 501B is provided with a joke that is more vocabulary level appropriate for her: "What's the difference between a taxidermist and a tax collector? The taxidermist only takes the skin."

Examples described herein have related to estimating vocal characteristics such as frequency components, cadence, tempo, and vocabulary levels contained within a vocal utterance, and operating automated assistant 120 in a manner that accommodates these estimations. However, this is not meant to be limiting. Other characteristics may be predicted/estimated based on their utterance.

Figure 6:
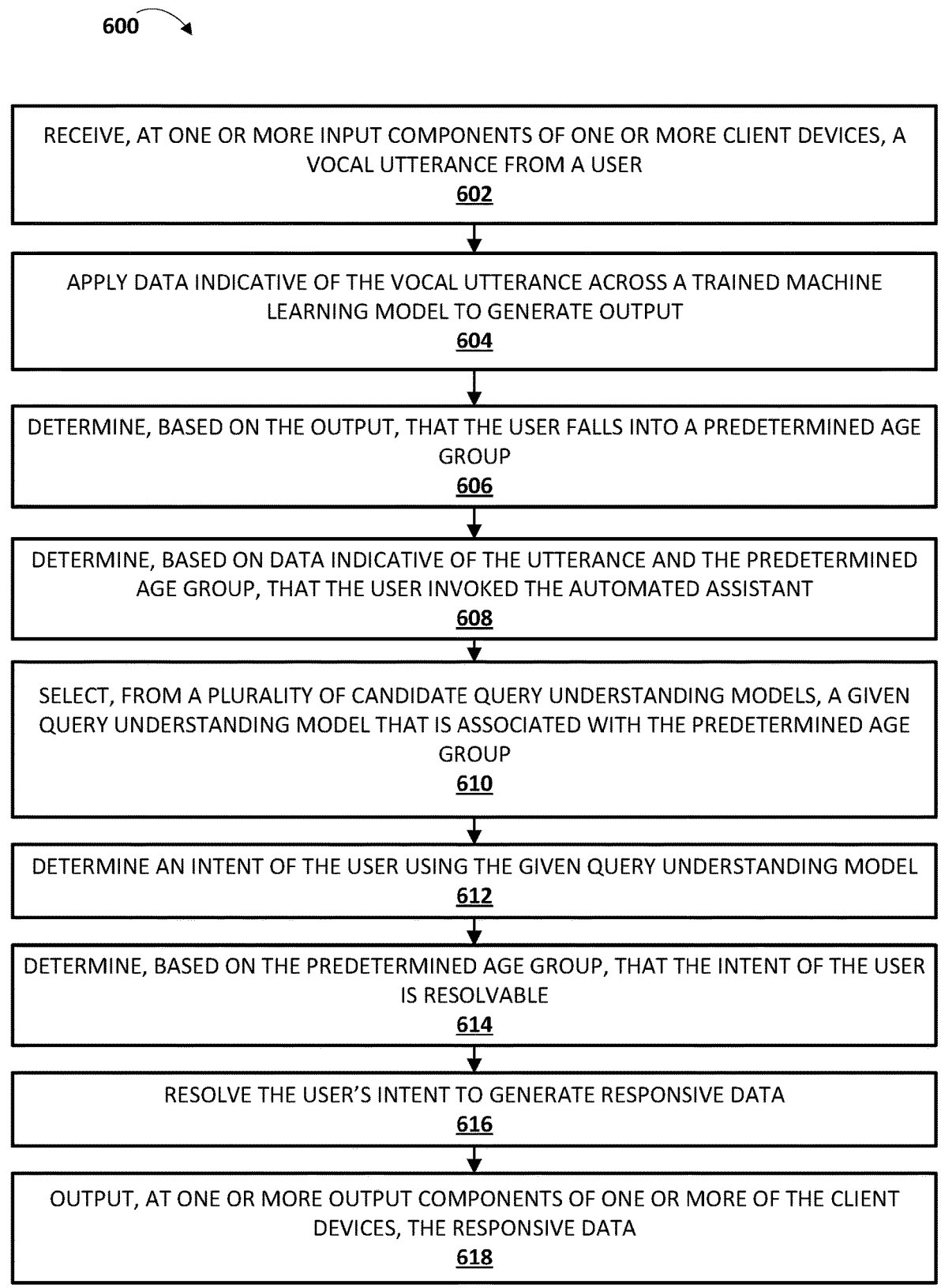
FIGS. 6 and 7 each depict a flowchart illustrating an example method according to implementations disclosed herein.

FIG. 6 illustrates a flowchart illustrating an example method 600 according to implementations disclosed herein. For convenience, the operations of the flow chart are described with reference to a system that performs the operations. This system may include various components of various computer systems, such as one or more components of computing systems that implement automated assistant 120. Moreover, while operations of method 600 are shown in a particular order, this is not meant to be limiting. One or more operations may be reordered, omitted or added.

At block 602, the system may receive, at one or more input components (e.g., a microphone) of one or more client devices, a vocal utterance from a user. At block 604, the system (e.g., by way of proficiency detector 111) may apply data indicative of the vocal utterance (e.g., an audio recording, feature vector) across a trained machine learning model to generate output. At block 606, the system may determine, based on the output generated at block 604, that the user falls into (or should be classified as) a vocabulary level group of a plurality of predefined vocabulary level groups. In other implementations, the user may be classified into other categories, such as gender.

At block 608, the system (e.g., invocation module 112) may determine, based on the predetermined vocabulary level group of the user and data indicative of the utterance, that the user invoked automated assistant 120. For example, an on-device model used by invocation module 112 may be trained to classify the user's utterance as an invocation or not an invocation, e.g., depending on whether an invocation score generated based on the model satisfies a threshold. In some implementations, this threshold may be altered, e.g., downward or upward, based on the user's vocabulary level or other characteristic of the vocal utterance. The invocation module 112 may set a lower invocation tolerance for utterances with a lower vocabulary level than compared to users with a relatively higher vocabulary level.

At block 610, the system may select, from a plurality of candidate query understanding models, a given query understanding model that is associated with the predetermined vocabulary level group. As noted above, this query understand model may include components that are used by STT module 117 to generate speech recognition output and/or components that are used by intent matcher 136 to determine the user's intent.

At block 612, the system, e.g., by way of intent matcher 136, may determine an intent of the user using the given query understanding model. In some implementations, the given query understand model may require less precision when determining the user's intent when the user has a lower vocabulary level and their utterance is not grammatically correct or easily understood.

At block 614, the system may determine, based on the predetermined vocabulary level group, that the intent of the user is resolvable. For example, if the determined vocabulary level is relatively low, then intents that require payment of funds for fulfillment may not be resolvable. At block 616, the system, e.g., by way of fulfillment module 124, may fulfill (or resolve) the user's intent to generate responsive data (e.g., fulfillment data described previously). At block 618, the system may output, at one or more output components of one or more of the client devices (e.g., a speaker, a display screen, etc.), the responsive data.

In the examples described herein, automated assistant 120 may be transitioned into non-native speaker mode so that it may be more tolerant of less-than-perfect grammar and provide output that is suitable for non-native speakers. Sometimes it might be the case that a particular assistant device is used mostly by non-native speakers. For example, a standalone interactive speaker may be deployed in a hotel lobby. In some implementations, such an assistant device may be configured to be in, by default, the non-native speaker mode. When in the default non-native speaker mode, the automated assistant may exhibit one or more of the various behaviors described previously, e.g., being more tolerant of grammatical and/or vocabulary errors, by default. The assistant device can transition at least temporarily to a normal operating mode (e.g., transition out of the non-native speaker mode) when a special invocation phrase is employed by invocation module 112 or the assistant device detects an utterance with a relatively high vocabulary level.

In some implementations, rather than predicting or estimating a speaker's vocabulary level, automated assistant 120 may be configured to perform voice recognition to authenticate the speaker. For example, members of a family may each train automated assistant 120 to recognize their voices, e.g., so that automated assistant 120 is aware of whom it is engaged with. The users may have profiles that include, among other things, their preferences. In some implementations, automated assistant 120 may use these profiles to determine or select responses to the user's utterances.

Figure 7:
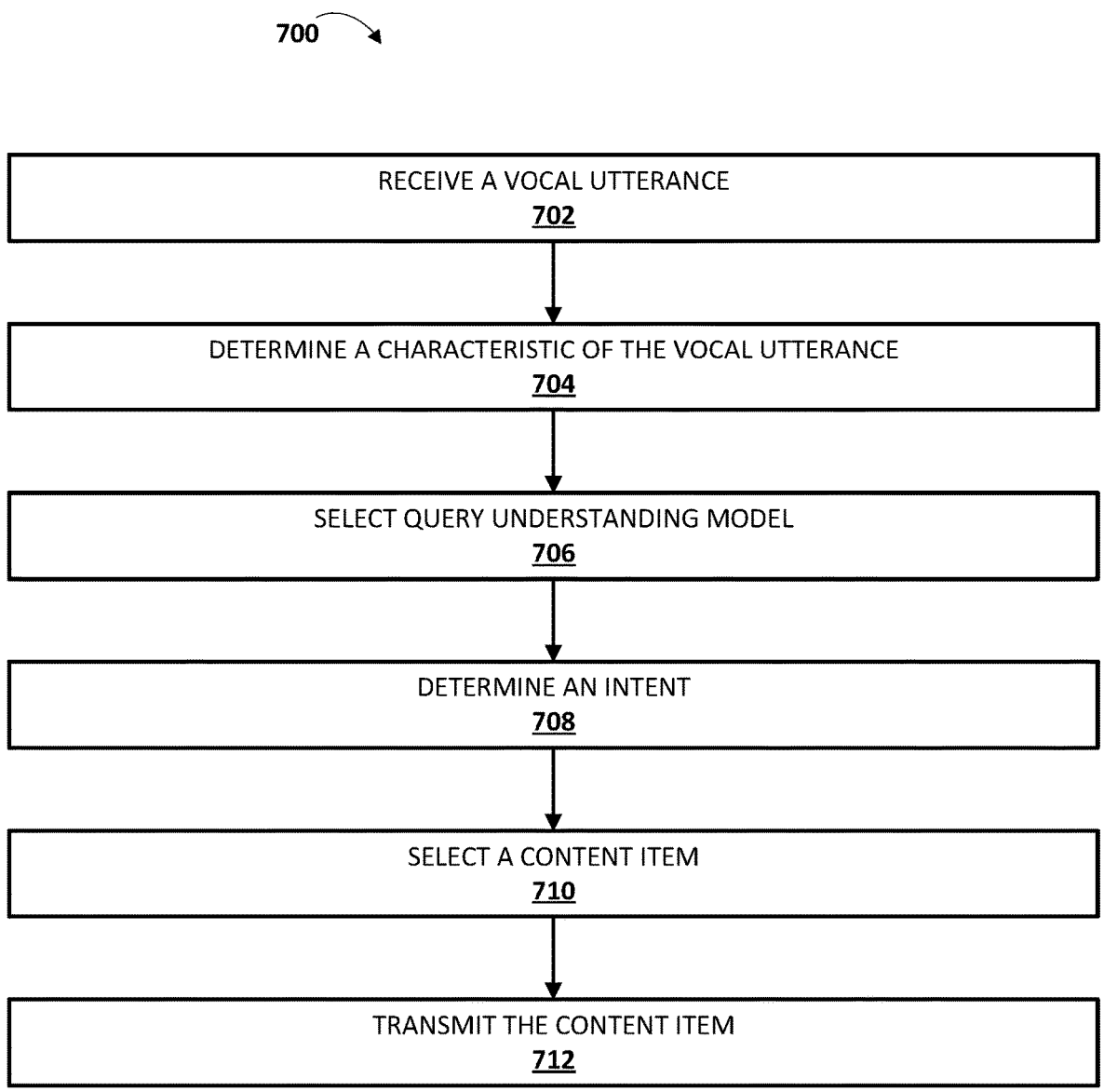

FIG. 7 illustrates a block diagram of an example method 700 to resolve request. The method 700 can include receiving a vocal utterance (Block 702). The method 700 can include determining a characteristic of the vocal utterance (Block 704). The method 700 can include selecting a query understanding model (Block 706). The method 700 can include determining an intent (Bock 708). The method 700 can include selecting a content item (Block 710). The method 700 can include transmitting the content item (Block 712).

As set forth above, at block 702, the system can receive a vocal utterance. For example, and also referring to FIG. 1, among others, the cloud-based automated assistant component 119 can receive the vocal utterance from a client device 106. The client device 106 can be a mobile device or speaker-based assistant device, for example. The client device 106 can include one or more microphones that can capture the vocal utterance made by a user. The client device 106 can capture and transmit the vocal utterance to the cloud-based automated assistant component 119 response to the user invoking the client device 106 with a wake word. The client device 106 can preprocess the vocal utterance prior to transmitting the vocal utterance to the cloud-base automated assistant component 119. For example, the client device 106 can filter the vocal utterance or can perform a Fast Fourier Transform (FFT) to identify frequency components within the vocal utterance.

At block 704, the system can determine a characteristic of the vocal utterance. For example, the automated assistant (at the client device or the cloud-based portion of the assistant device) can include a proficiency detector. The proficiency detector can determine vocal or other characteristics of the received vocal utterance. For example, the proficiency detector can perform an FFT to identify vocal characteristics contained within the vocal utterance. The vocal characteristics can include phonemes, pitch, frequency components, and cadence of the vocal utterance. The characteristics of the vocal utterance can include a vocabulary level of the input or words within the vocal utterance. For example, the proficiency detector can perform natural language processing to identify characteristics of the vocal utterances such as the complexity of the terms, sentence structure, vocabulary level, or phrases contained within the vocal utterance.

At block 706, the method 700 can include selecting a query understanding model. Also referring to FIG. 1, among others, the speech-to-text module, for example, may select, from a plurality of candidate query understanding models, a given query understanding model. The speech-to-text module can select the query understanding model based on the vocal characteristic (e.g., the frequency component, vocabulary, pitch, cadence, or phonemes) of the vocal utterance. The query understanding model can include components that are used by the STT module 117 to generate speech recognition output and/or components that are used by intent matcher 136 to determine the user's intent. For example, the query understanding model can include thresholds one or more tolerance or other thresholds associated with, for example, grammatical tolerances or vocabulary tolerances.

At block 708, the method 700 can include determining an intent. The intent matcher can determine the intent of the vocal utterance using the selected query understanding model. For example, the intent matcher 136 can determine an intent of the user based on output from natural language processor 122, which may include annotations and terms of the natural language input. The intent matcher 136 can access one or more databases 137 that include, for instance, a plurality of mappings between grammars and responsive actions (e.g., intents). The intent matcher 136 can select the grammars based on the vocal characteristic (e.g., the frequency component, vocabulary, pitch, cadence, or phonemes) of the vocal utterance.

At block 710, the method 700 can include selecting a content item. The fulfillment module 124 or the content selector component 154 can select the content item. The content selector component 154 can select, for example, the content item based on the intent identified in the vocal utterance at BLOCK 708. The content selector component 154 can also select the content item based on a request and one or more keywords identified in the vocal utterance. For example, the natural language processor 122 can determine that the vocal utterance includes the request to "play music." Based on the keyword "play," the intent matcher can determine the request is for one or more songs. The content selector component 154 can select one or more songs (e.g., content items) in response to the content request. In some implementations the content selector component 154 can select a secondary content item. The content selector component 154 can select the secondary content item based on the content items selected in response to the request and keywords in the vocal utterance. For example, after selecting the songs in the above example, the content selector component 154 may select an image- or video-based content item that includes the musician that sings the one or more songs.

At block 712, the method 700 can include transmitting the content item. The content item (and secondary content item) may be selected by the cloud-based automated assistant component 119. The cloud-based automated assistant component 119 may transmit the content item and the secondary content item to the client device 106 via a network 114. The cloud-based automated assistant component 119 can transmit the content item to a first client device 106 and the secondary content item to a second client device 106. For example, the cloud-based automated assistant component 119 can transmit the content item to the client device 106 that received the vocal utterance. For example, the cloud-based automated assistant component 119 can transmit the content item to an automated assistant client 108 that is executed on a speaker-based client device. The cloud-based automated assistant component 119 can transmit the secondary content item to, for example, a mobile phone that is associated with the speaker-based client device.

Figure 8:
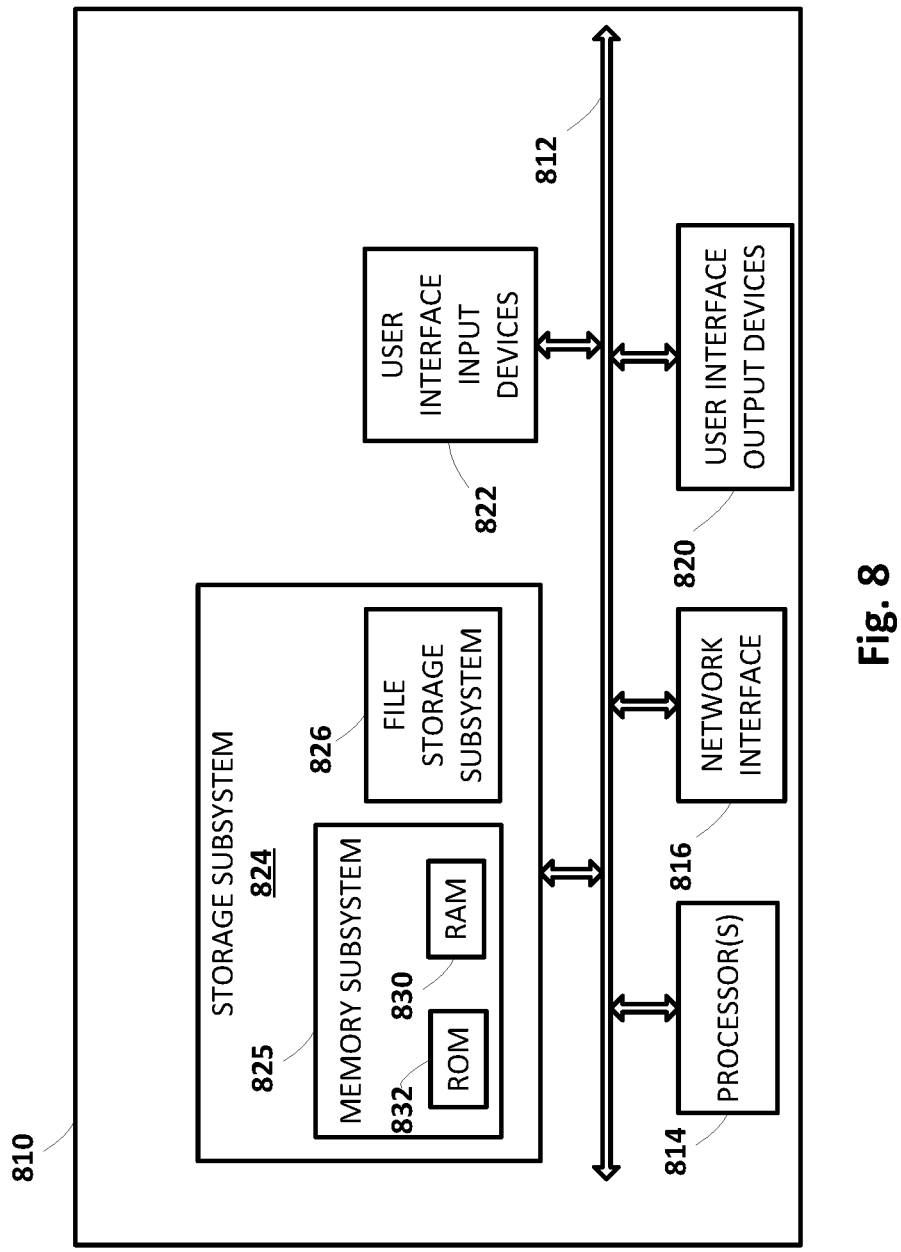
FIG. 8 illustrates an example architecture of a computing device.

FIG. 8 is a block diagram of an example computing device 810 that may optionally be utilized to perform one or more aspects of techniques described herein. In some implementations, one or more of a client computing device, cloud-based automated assistant components 119, and/or other component(s) can include one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIG. 6, as well as to implement various components depicted in FIGS. 1 and 2.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. For example, in some implementations, users may opt out of having automated assistant 120 attempt to estimate their vocabulary level.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A system to resolve requests in an audio-based networked system, comprising a computing device comprising one or more processors and a memory, the one or more processors to execute:

a proficiency detector to:

receive a vocal utterance captured at a client device;

determine a vocal characteristic of the vocal utterance captured at the client device;

a speech-to-text module to select a query understanding model from a plurality of candidate query understanding models based on the vocal characteristic;

an intent matcher to determine an intent of the vocal utterance using the query understanding model;

a fulfillment module to select a content item based on the intent and one or more keywords parsed from the vocal utterance; and an interface to transmit the content item to the client device.

2. The system of claim 1, comprising:

a content selector component to select a digital component based on the one or more keywords parsed from the vocal utterance; and the interface to transmit the digital component to the client device.

3. The system of claim 1, wherein each of the plurality of candidate query understanding models include a different grammatical tolerance.

4. The system of claim 1, comprising:

the proficiency detector to determine a vocabulary level of the vocal utterance; and the fulfillment module to select the content item based on the vocabulary level of the vocal utterance.

5. The system of claim 1, comprising:

the proficiency detector to determine a vocabulary level of the vocal utterance; and the speech-to-text module to select the query understanding model from the plurality of candidate query understanding models based on the vocabulary level of the vocal utterance.

6. The system of claim 1, wherein the vocal characteristic comprises at least one of phonemes, a pitch, frequency components, or a cadence of the vocal utterance.

7. The system of claim 1, comprising:

the fulfillment module to select the content item based to match a vocabulary level of the vocal utterance.

8. The system of claim 1, comprising:

a text-to-speech module to select a voice synthesis model based on the vocal characteristic of the vocal utterance, the voice synthesis model to render the content item at the client device.

9. The system of claim 1, comprising:

an invocation module to set an invocation threshold to invoke processing of vocal utterances based on the vocal characteristic.

10. The system of claim 1, comprising:

a natural language processor to increase a tolerance to at least one of grammatical, vocabulary, or pronunciation errors based on the vocal characteristic.

11. A method implemented using one or more processors, comprising:

receiving, by a proficiency detector executed by one or more processors, a vocal utterance captured at a client device;

determining, by the proficiency detector executed by the one or more processors, a vocal characteristic based on the vocal utterance captured at the client device;

selecting, by a speech-to-text module executed by the one or more processors, a query understanding model from a plurality of candidate query understanding models based on the vocal characteristic;

determining, by an intent matcher executed by the one or more processors, an intent of the vocal utterance using the query understanding model;

selecting, by a fulfillment module executed by the one or more processors, a content item based on the intent and one or more keywords parsed from the vocal utterance; and transmitting, by the one or more processors, the content item to the client device.

12. The method of claim 11, comprising:

selecting, by a content selector component executed by the one or more processors, a digital component, based on the one or more keywords parsed from the vocal utterance; and transmitting, by the one or more processors, the digital component to the client device.

13. The method of claim 11, wherein each of the plurality of candidate query understanding models include a different grammatical tolerance.

14. The method of claim 11, comprising:

determining a vocabulary level of the vocal utterance; and selecting the content item based on the vocabulary level of the vocal utterance.

15. The method of claim 11, comprising:

determining a vocabulary level of the vocal utterance; and selecting the query understanding model from the plurality of candidate query understanding models based on the vocabulary level of the vocal utterance.

16. The method of claim 11, wherein the vocal characteristic comprises at least one of phonemes, a pitch, frequency components, or a cadence of the vocal utterance.

17. The method of claim 11, comprising:

selecting, by the fulfillment module executed by the one or more processors, the content item based to match the vocal characteristic.

18. The method of claim 11, comprising:

selecting a voice synthesis model based on the vocal characteristic to render the content item at the client device.

19. The method of claim 11, comprising:

setting, by an invocation module executed by the one or more processors and based on the vocal characteristic, an invocation threshold to invoke processing of vocal utterances.

20. The method of claim 11, comprising:

increasing, by a natural language processor executed by the one or more processors, a tolerance to at least one of grammatical, vocabulary, or pronunciation errors based on the vocal characteristic.

* * * * *